US009633364B2

(12) United States Patent
Martini et al.

(10) Patent No.: US 9,633,364 B2
(45) Date of Patent: Apr. 25, 2017

(54) METHOD AND APPARATUS FOR DETECTING FRAUDULENT ADVERTISING TRAFFIC INITIATED THROUGH AN APPLICATION

(75) Inventors: Eduard Erwin Martini, Cluj-Napoca (RO); Mircea Gindulescu, Cimpulung Moldovenesc (RO)

(73) Assignee: NOKIA TECHNOLOGIES OY, Espoo (FI)

( * ) Notice: Subject to any disclaimer, the term of this patent is extended or adjusted under 35 U.S.C. 154(b) by 326 days.

(21) Appl. No.: 12/982,534

(22) Filed: Dec. 30, 2010

(65) Prior Publication Data

US 2012/0173315 A1 Jul. 5, 2012

(51) Int. Cl.
 *G06Q 30/00* (2012.01)
 *G06Q 30/02* (2012.01)

(52) U.S. Cl.
 CPC ..... *G06Q 30/0241* (2013.01); *G06Q 30/0248* (2013.01)

(58) Field of Classification Search
 CPC ....... G06F 21/00; G06F 21/606; H04L 63/20; G06Q 30/0225
 See application file for complete search history.

(56) References Cited

U.S. PATENT DOCUMENTS

| 7,779,121 | B2* | 8/2010 | Salo et al. | 709/224 |
| 7,917,491 | B1* | 3/2011 | Sack | 707/708 |
| 7,953,667 | B1 | 5/2011 | Zuili | |
| 8,103,543 | B1* | 1/2012 | Zwicky | 705/14.26 |
| 8,131,594 | B1* | 3/2012 | Yehoshua et al. | 705/14.53 |
| 2001/0047294 | A1* | 11/2001 | Rothschild | 705/14 |
| 2004/0153365 | A1* | 8/2004 | Schneider et al. | 705/14 |

(Continued)

FOREIGN PATENT DOCUMENTS

| CN | 1545050 A | 11/2004 |
| CN | 101145231 A | 3/2008 |

(Continued)

OTHER PUBLICATIONS http://www.merriam-webster.com/dictionary/facilitate Merriam-Webster—dictionary definition of facilitate.*

(Continued)

*Primary Examiner* — Bennett Sigmond
*Assistant Examiner* — Christopher Stroud
(74) *Attorney, Agent, or Firm* — Ditthavong & Steiner, P.C.

(57) ABSTRACT

An approach is provided for detecting fraudulent advertising traffic initiated through an application. An advertising platform receives a request, from an advertising module, for serving of advertisement information, wherein code for executing the advertising module is integrated with other code of an application executing at a device. The advertising platform causes, at least in part, processing of the advertisement information to include at least one verification check of the advertising module, the code for executing advertising module, the application, the other code associated with the application, or a combination thereof. The advertising platform causes, at least in part, transmission of the at least one verification check in response to the request for serving of the advertisement information. The advertising platform causes, at least in part, processing of one or more results of the at least one verification check to determine a functioning of the advertising module.

14 Claims, 14 Drawing Sheets

(56) References Cited

U.S. PATENT DOCUMENTS

| | | | |
|---|---|---|---|
| 2006/0136294 | A1 | 6/2006 | Linden et al. |
| 2006/0265493 | A1* | 11/2006 | Brindley et al. ............... 709/224 |
| 2007/0255821 | A1* | 11/2007 | Ge et al. ........................ 709/224 |
| 2008/0201214 | A1 | 8/2008 | Aaron et al. |
| 2008/0294711 | A1 | 11/2008 | Barber |
| 2008/0320125 | A1 | 12/2008 | O'Sullivan et al. |
| 2009/0164269 | A1* | 6/2009 | Gupta et al. ........................ 705/7 |
| 2009/0327059 | A1 | 12/2009 | Grigorovitch |
| 2010/0121692 | A1* | 5/2010 | Top .............................. 705/14.4 |
| 2010/0228852 | A1 | 9/2010 | Gemelos et al. |
| 2010/0287040 | A1* | 11/2010 | Martin-Cocher et al. ... 705/14.4 |
| 2010/0306055 | A1* | 12/2010 | Kolb .......................... 705/14.55 |
| 2011/0296009 | A1* | 12/2011 | Baranov et al. ............... 709/224 |
| 2012/0130801 | A1* | 5/2012 | Baranov et al. ........... 705/14.43 |

FOREIGN PATENT DOCUMENTS

| | | |
|---|---|---|
| CN | 101754166 A | 6/2010 |
| WO | WO 2008/030670 A1 | 3/2008 |
| WO | WO 2009/018566 A2 | 2/2009 |

OTHER PUBLICATIONS

CAPTCHA, Feb. 20, 2011, http://en.wikipedia.org/wiki/CAPTCHA, pp. 1-8.

Fighting Online Click-Fraud Using Bluff Ads, Haddadi, Hamed, ACM SIGCOMM Computer Communication Review, vol. 40, No. 2, Apr. 2010, pp. 1-4.

Privad: Rearchitecting Online Advertising for Privacy, Technical Report: MPI-SWS-2009-004, Guha et al., Max Planck Institute for Software Systems, Oct. 2, 2009, pp. 1-30.

Serving Ads from localhost for Performance, Privacy, and Profit, Guha et al., accessed on Feb. 22, 2011, http://adresearch.mpi-sws.org/privad-workshop.pdf, pp. 1-6.

International Search Report PCT Application No. PCT/FI2011/051113 dated Mar. 19, 2012, pp. 1-5.

Written Opinion PCT Application No. PCT/FI2011/051113 dated Mar. 19, 2012, pp. 1-7.

Extended European Search Report for related European Application No. 11 852 934.6-1958 dated Jun. 5, 2014.

* cited by examiner

METHOD AND APPARATUS FOR DETECTING FRAUDULENT ADVERTISING TRAFFIC INITIATED THROUGH AN APPLICATION

BACKGROUND

Service providers (e.g., wireless and cellular services) and device manufacturers are continually challenged to deliver value and convenience to consumers by, for example, providing compelling network services and advancing the underlying technologies. One area of interest has been the development of online application stores for making applications (e.g., both first party and third-party applications) available to, for instance, mobile devices and/or other user devices. As more advertisement capable applications are being developed by third parties and downloaded to user mobile phones via online stores, more advertisements are served there through these applications. Although advertising traffic (e.g., clicks/views rates) is relatively easy to measure, they are susceptible to unscrupulous manipulation. It is noted that some of these applications can engage in fake reporting of advertising traffic to obtain financial gains. Accordingly, service providers and device manufacturers face significant technical challenges to detect such fraud.

SOME EXAMPLE EMBODIMENTS

Therefore, there is a need for an approach for detecting fraudulent advertising traffic initiated through an application.

According to one embodiment, a method comprises receiving a request, from an advertising module, for serving of advertisement information, wherein code for executing the advertising module is integrated with other code of an application executing at a device. The method also comprises causing, at least in part, processing of the advertisement information to include at least one verification check of the advertising module, the code for executing advertising module, the application, the other code associated with the application, or a combination thereof. The method further comprises causing, at least in part, transmission of the at least one verification check in response to the request for serving of the advertisement information. The method further comprises causing, at least in part, processing of one or more results of the at least one verification check to determine a functioning of the advertising module.

According to another embodiment, an apparatus comprises at least one processor, and at least one memory including computer program code, the at least one memory and the computer program code configured to, with the at least one processor, cause, at least in part, the apparatus to receive a request, from an advertising module, for serving of advertisement information, wherein code for executing the advertising module is integrated with other code of an application executing at a device. The apparatus is also caused to process the advertisement information to include at least one verification check of the advertising module, the code for executing advertising module, the application, the other code associated with the application, or a combination thereof. The apparatus is further caused to transmit the at least one verification check in response to the request for serving of the advertisement information. The apparatus is further caused to process one or more results of the at least one verification check to determine a functioning of the advertising module.

According to another embodiment, a computer-readable storage medium carries one or more sequences of one or more instructions which, when executed by one or more processors, cause, at least in part, an apparatus to receive a request, from an advertising module, for serving of advertisement information, wherein code for executing the advertising module is integrated with other code of an application executing at a device. The apparatus is also caused to process the advertisement information to include at least one verification check of the advertising module, the code for executing advertising module, the application, the other code associated with the application, or a combination thereof. The apparatus is further caused to transmit the at least one verification check in response to the request for serving of the advertisement information. The apparatus is further caused to process one or more results of the at least one verification check to determine a functioning of the advertising module.

According to another embodiment, an apparatus comprises means for receiving a request, from an advertising module, for serving of advertisement information, wherein code for executing the advertising module is integrated with other code of an application executing at a device. The apparatus also comprises means for causing, at least in part, processing of the advertisement information to include at least one verification check of the advertising module, the code for executing advertising module, the application, the other code associated with the application, or a combination thereof. The apparatus further comprises means for causing, at least in part, transmission of the at least one verification check in response to the request for serving of the advertisement information. The apparatus further comprises means for causing, at least in part, processing of one or more results of the at least one verification check to determine a functioning of the advertising module.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for detecting fraudulent advertising traffic initiated through an application are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "verification check" refers to an investigating event for electronic fraudulent traffic reporting. A "verification check" can be unknown to a third party application and transmitted via a normal advertisement information data channel. Although various embodiments are described with respect to click/view fraud and similar schemes, it is contemplated that the approach described herein may be used with other electronic advertising traffic reporting fraud. Examples of electronic advertising include contextual advertisements on application pages, banner ads, rich media Ads, social network advertising, electronic classified advertising, advertising networks and e-mail marketing (e.g., e-mail spam), etc.

As used herein, the term "electronic advertisement form/format" refers to any form or format of advertisement served via an electronic document and/or application. Although various embodiments are described with respect to advertisement banners, it is contemplated that the approach described herein may be used with other electronic advertising forms or formats. Examines include a floating advertisement that moves across the user's screen or floats above the content, expanding advertisement that changes size and that may alter the contents of the electronic document and/or application, polite advertisement that is downloaded in smaller pieces to minimize the disruption of the content being viewed, wallpaper advertisement that changes the background of the content being viewed, trick banner that looks like a dialog box with buttons and simulates an error message or an alert, pop-up, pop-under that is loaded or sent behind the current window so that the user does not see it until they close one or more active windows, video advertisement, map advertisement including text or graphics linked from, and appearing in or over, a location on an electronic map, mobile advertisement including an SMS text or multimedia message sent to a cell phone, superstitial including an animated adv using video, 3D content or Flash to provide a TV-like advertisement, interstitial advertisement including a full-page advertisement that appears before a user reaches their original destination, etc.

Figure 1:
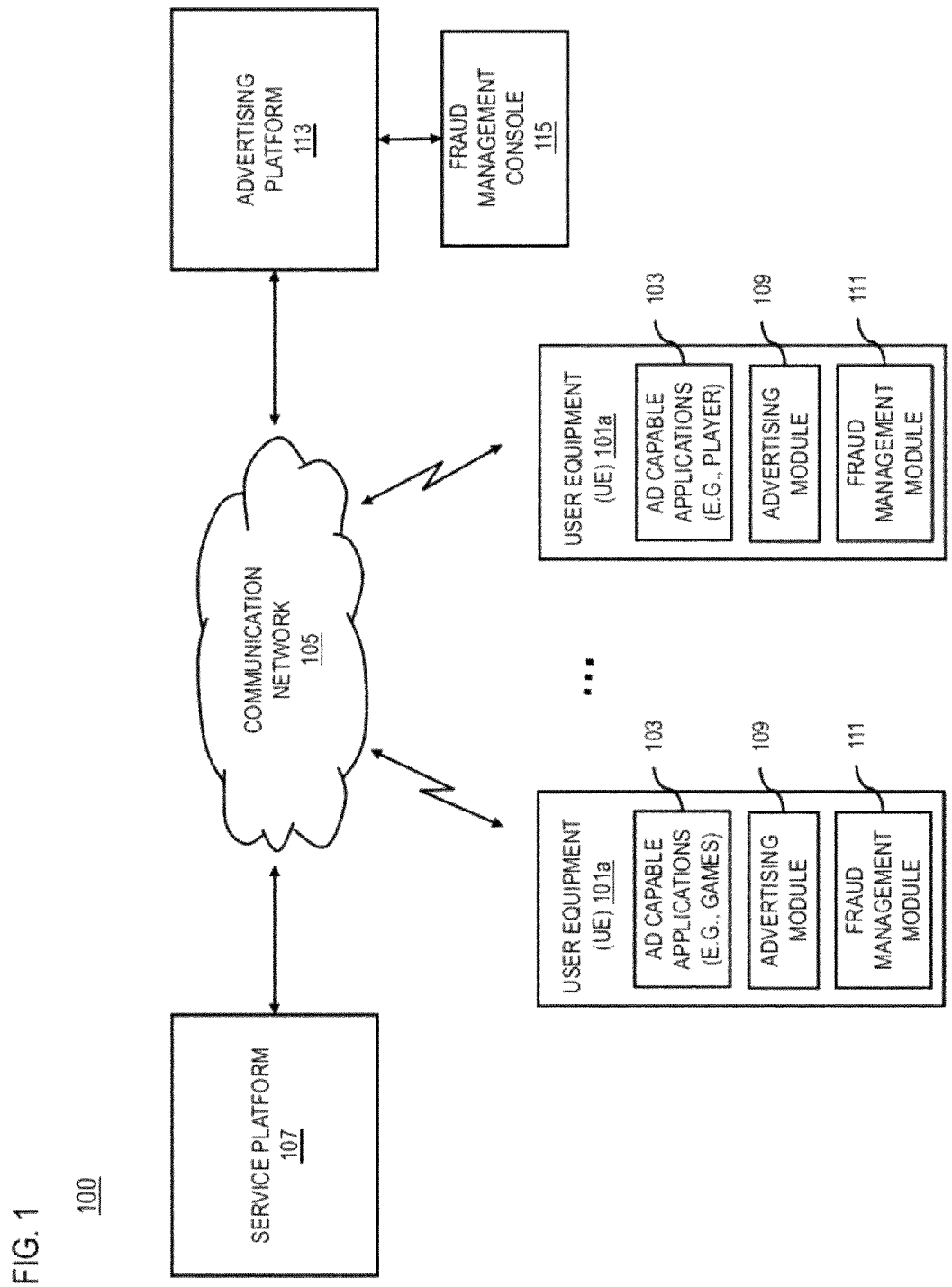
FIG. 1 is a diagram of a system capable of detecting fraudulent advertising traffic initiated through an application, according to one embodiment.

FIG. 1 is a diagram of a system capable of detecting fraudulent advertising traffic initiated through an application, according to one embodiment. As noted previously, service providers and device manufacturers are generating advertisement revenue via offering third party developers an application development platform and presenting advertisements on user devices via the developed third party applications, such as messaging, navigation, maps, social networking, media (e.g., video, audio, images, etc.), games, stores, etc. For example, a third party game application may display, in a portion of a graphical user interface, the advertisement in parallel with presenting the gaming features.

Prior to presenting any advertisement triggers (e.g., an advertisement banner, etc.) via the advertisement capable application, the application communicates with an advertising platform to integrate therein an advertising module that inserts advertisement banners into one or more user interfaces, such as graphical user interfaces (GUIs), touch screens, motion tracking interfaces, etc, of the application. Each time an advertisement trigger is activated on a user interface screen, the advertising module uses inline code to display advertisement content cached therein or fetched from an advertising platform/server. An advertisement information serving request is sent to the advertising platform/server, when an advertisement trigger is activated. By way of example, for sponsored advertisements, the advertising platform/server sends the corresponding advertisement information to display corresponding advertisement via the application and pays the application developer based on the number of clicks or impressions.

The major threat to the growth of online advertising revenues is fraudulent traffic, such as click-fraud, view fraud, etc. Trained botnets are deployed to make up false advertisement clicks and/or impressions (views) via the third party applications that display the advertisements and maximize the revenue of the application developers. The overall industry average click fraud rate was 22.3 percent for the third quarter of 2010. When serving advertisements on user devices via a third-party developed application, the third party developer of the application has full control/access to the advertisements and can engage in fake reporting by learning the behavior of the advertising module and replicating the in/out requests programmatically. The advertising platform/server cannot tell if the advertisement serving request comes from the client side advertising module or from the replicated functionality that fakes the clicks/views to increase the developer's revenues while the advertisers have a very low return of investment.

Many traditional anti-click fraud methods for web-based applications cannot be applied to non-web-based third party applications. For example, the anti-click fraud methods in a web environment prevents the applications from generating fraud clicks to an advertisement banner in a web page because the advertisement banner is loaded into the affiliate application document object model (DOM) and can be controlled as any other element from the application. However, this cannot be prevented for an advertisement banners in a non-web-based application running at desktop computers, mobile devices, etc.

To address these problems, a system 100 of FIG. 1 introduces the capability to detect fraudulent advertising traffic initiated through an application running at UE 101. The system 100 detects fraudulent advertisement traffic reporting events by initiating verification checks that are transmitted via normal advertisement information data channels unknown to the third party applications. These verification checks can be used to perpetuate click fraud and similar schemes. In some embodiments, the system 100 altered reporting parameters, such as different reporting templates, different reporting mechanisms, different hash parameters, or a combination thereof, to check if the application changes the report accordingly. If not, the system 100 determines that there is evidence that the application and/or developer may have committed a fraud.

In another embodiment, the system 100 requests the application to revalidate the report in a different format to check for fraud. If the application fails to change the reporting format accordingly, the system 100 determines the application and/or the developer commits frauds.

In another embodiment, the system 100 assigns to each advertisement banner a unique id on the advertising platform side. Thereafter, when delivering the HTML code for the banner, the advertising platform also delivers the HTML code for non-active regions (e.g., HTML divs defined, for instance, by the HTML div tag) then generates and loads the Cascading Style Sheets (CSS) on the client side advertising module. In one embodiment, the divs or non-active regions are unknown to the application and the developer. When the advertisement traffic report contains clicks on the non-active divs, the system 100 determines that there is evidence that the application and/or the developer may have committed a fraud.

In other embodiments, the system 100 sends custom code via a normal data channel to the user devices, to use the third party applications to run the custom code and "investigate" if there is any fraud. The custom code may retrieves advertisement logs, fetch action reports, inspect advertisement lifecycles on the devices, etc. Therefore, the system 100 obtains information of how the fraud mechanisms are implemented and obtains "hard" evidences of the fraud. The information can be used to improve the advertising module and the advisement platform/server to eliminate these types of fraud implementation.

In yet other embodiments, the system 100 attaches the verification checks to existing estimated behavioral analysis systems and instructs the estimated behavioral analysis systems to run the verification checks on all suspicious developers. This approach addresses the problem of an estimated behavioral analysis system that typically requires significant human effort to analyze a huge amount of false positive fraud reports. This significantly reduces the false positive fraud reports.

The system 100 can comprise user equipment (UEs) 101a-101n that may execute advertisement capable applications 103 such as game applications, media applications (e.g., video, audio, images, etc.), messaging applications, navigation applications, map applications, social networking applications, retail purchasing applications, etc. By way of example, an advertisement capable application 103 performs a task (e.g., connecting to a gaming platform) and displays an advertisement on a UE 101. Some or all of the applications may obtain services (e.g., network services) associated with advertisement capable applications 103 via a communication network 105 from a service platform 107. It is noted that, in certain embodiments, the advertisements may be displayed after the user selecting the application 103 yet before user interacting with the application 103, such as during booting up the application 103 (e.g., a gaming application). The approach described herein applies to any other situation in which advertisement is presented via the application 103 at the UE 101.

To provide revenue for the application developer, UE maker, communication network provider, etc., the advertisement capable applications 103, or the UE 101 itself, can be associated with or embedded therein an advertising module 109. The advertising module 109 can present advertisements to the user during the execution of the application 103, before execution of the application 103, after execution of the application 103, or a combination thereof. The advertising module 109 manages advertising access of the applications 103 to network materials at different advertising platforms and servers in a customizable manner.

In one embodiment, advertisements to be displayed to users of devices can be retrieved from the advertising platform 113 by the applications 103, stored in a cache of the UE 101, and presented to the user. Advertising modules or engines can retrieve advertisements from the cache to present advertisements with one or more applications 103. In certain embodiments, the advertising module 109 is a program and/or hardware resident on the UE 101 that can retrieve advertisements from the advertising platform/server 113 and control presentation of the advertisements. The advertising module 109 can fetch advertisements from the advertising platform/server 113 via an Application Programming Interface (API) to store in the cache for presentation via, for instance, the applications. Further, the advertising module 109 can provide an API for applications running the advertising module to request advertisements to present.

Although the applications 103 and the advertising module 109 are shown as independent client components, in other configurations, the advertising module 109 may be incorporated directly into the applications 103, such as by compiling the applications using shared or static libraries that include the functionality of the advertising module 109. Even when the applications 103 include the functionality of the advertising module 109, it may be desirable to have a system utility with some functionality for monitoring relevant activity of all applications 103, in case malware is distributed as a rogue application 103.

In certain embodiments, the advertisement capable application 103 enables the use of the advertising module 109 (e.g., via an API) to present advertisements associated with the application 103. As noted above, the application 103 may present the advertisements in a portion of a graphical user interface (GUI) associated with the application 103. Further, the advertising module 109 may control advertisements provided to and/or presented by the applications 103. As the advertising module 109 is used to present advertisements, data can be collected by the advertising module 109 and/or a fraud management module 111 of the UE 101. Such data can include, for example, whether the number of impressions of a particular advertisement the number of times the user clicked on one of the advertisements, and/or verification check for advertising traffic fraud was made, etc.

In another embodiment, the advertising module 109 and/or the fraud management module 111 of the UE 101 are lightweight pieces of code that only respond to instructions from the advertising platform 113 by sending feedbacks, and have no statistics of impressions, clicks, and/or fraud detection. The advertising platform 113 stores and handles reports, statistics, and fraud analysis. Therefore, a third party developer may not access to these statistics and reports at the UE 101. In addition, having minimum logic in the UE 101 reduces the possibility of exposing the fraud detecting mechanism to the third party developer. Accordingly, the lightweight code and minimum logic can result in improved power consumption efficiency, thus extending operation time and the battery life of the UE 101.

The advertising module 109 requests one or more advertisements from the advertising platform 113 and receives one or more advertisements from the advertising platform 113. The advertising module 109 can populate advertisement information into a local advertisement memory via an advertising platform 113. In certain embodiments, the advertisements may be streamed or otherwise retrieved from the advertising platform 113. It is noted that the application 103 or other system processes may perform the actions of the advertising module 109 or a fraud management module 111 of the UE 101.

The fraud management module 111 can be utilized to analyze and manage states and advertisement traffic reporting data of the applications 103 based on one or more algorithm. Further, the fraud management module 111, based on one or more algorithms, can determine that a report is suspect to contain one or more click-fraud type events, and may block the reporting connection, add a flag or other data to later connection requests to advertising platform 113, and/or direct the connection request to an analysis server or the fraud management console 115 to handle the fraudulent event. The fraud management module 111 may have other ways of detecting these types of fraudulent events for malware that does not access the applications 103. For example, the fraud management module 111 may be capable of directly monitoring one or more of the network stacks and/or network drivers of the UE 101.

In another embodiment, the fraud management module 111 of the UE 101 is a lightweight piece of code that only respond to instructions from the advertising platform 113 by sending feedbacks, and has no statistics of impressions, clicks, and/or fraud detection. The reports, statistics, and fraud analysis are stored and handled by the advertising platform 113. As mentioned, having minimum logic in the UE 101 reduces the possibility of exposing the fraud detecting mechanism to the third party developer. As noted previously, the lightweight code and minimum logic can result in improved power consumption efficiency, thus extending operation time and the battery life of the UE 101.

The advertising module 109 and/or the fraud management module 111 are configurable by the advertising platform 113 and/or the user, either directly or via a system utility or application. A configuration UI component may be used to allow the user to change settings, disable/enable the advertising module 109 and/or the fraud management module 111, associate the advertising module 109 and/or the fraud management module 111 with particular applications 103, etc. The UI component may be specific to the fraud management module 111, or may be incorporated into applications 103 using technologies such as Java®, Beans®, ActiveX®, etc. Similarly, a notification UI component may be either standalone or incorporated into other applications. The notification UI component may be activated to inform the user when specific suspect events are detected.

The advertising platform 113 may include advertising information (e.g., advertisement content, metadata, execution code, etc.) that can be altered and/or updated by a fraud management console 115. The fraud management console 115 can be a workstation, server or other computing device that may be utilized to alter and/or update advertising information of the advertising platform 113 (e.g., specify new advertisements, target demographics, dates, verification checks for frauds, etc.). Additionally, the advertising platform 113 can receive a request from the fraud management console 115 and/or another device connected via the communication network 105 to initiate a verification check for advertising traffic fraud for a target application or developer.

Further, the fraud management console 115 can be utilized to present reports as to how a verification check for advertising traffic fraud is implemented. The reports may include information as to what the goal of the verification check for advertising traffic fraud is (e.g., the number of click/view frauds, the advertisements, users, clicks, and/or impressions associated with the frauds, the fraudulent revenues associated with the verification checks, etc.), the actual rate at which the advertisements are being distributed, etc. Moreover, the fraud management console 115 may additionally be utilized to enter input to manually adjust verification checks (e.g., based on progress of the verification check for advertising traffic fraud). For example, a human investigator can set or adjust a verification check based on determined fraudulent click-through-rates associated with advertisements presented at the UEs 101.

Since the system 100 sends custom code via a normal data channel to the user devices, there is no need to create a custom channel. In this way, the system 100 conserves operational and computational resources. In addition, the system 100 takes advantage of the third party applications to run the custom code and "investigate" if there is any fraud, rather than using any custom applications to run the custom code, thus further conserving the operational and computational resources.

The system 100 can broadcast alerts of fraudulent applications and/or developers to initiate an electronic verification check campaign for advertising traffic fraud. In some embodiments, a verification check for advertising traffic fraud is a series of advertisements to convey one or more messages for the advertiser. The verification check for advertising traffic fraud can include one or more advertisements to present to the users. The verification check results and investigation results can be utilized to improve click-through-rates and user experience associated with the verification check for advertising traffic fraud as further described in processes of FIGS. 6-9.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, the service platform 107, and advertising platform 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the service platform 107 and/or the advertising platform 113 may interact according to a client-server model with the advertisement capable applications 103, the advertising modules 109, and/or the fraud management modules 111. According to the client-server model, a client process sends a message including a request to a server process, and the server process responds by providing a service (e.g., messaging, advertisements, etc.). The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
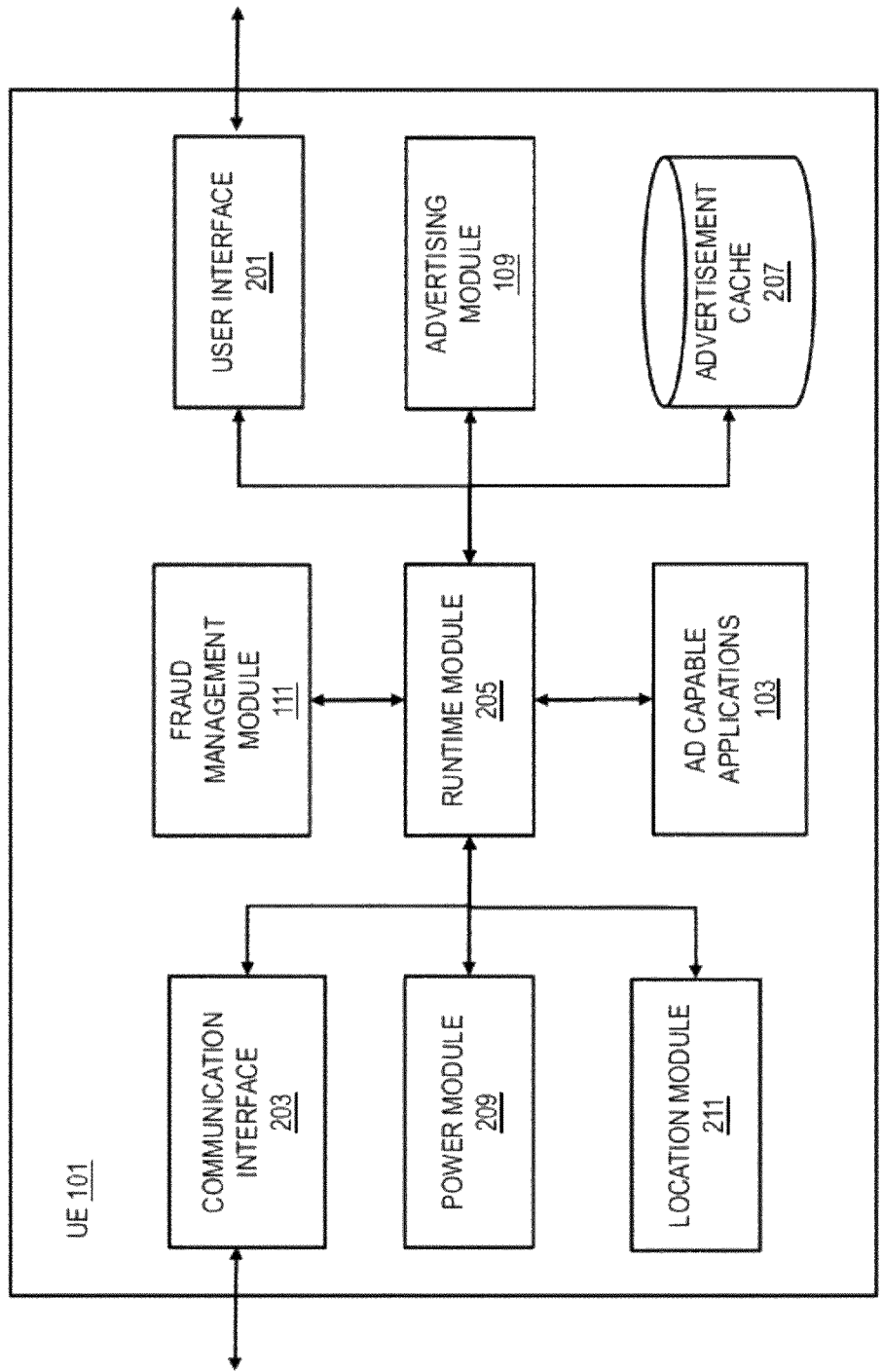
FIG. 2 is a diagram of the components of user equipment associated with presenting advertisements to a user, according to one embodiment.

FIG. 2 is a diagram of the components of user equipment associated with presenting advertisements to a user, according to one embodiment. By way of example, the UE 101 includes one or more components for presenting advertisements to a user and reporting advertisement traffic information to the advertising platform 113. It is contemplated that the functions of these components may be combined in one or more components or performed by other components of equivalent functionality.

In this embodiment, the UE 101 includes an user interface 201 to receive input and provide output at the UE 101, a communication interface 203 to communicate over the network 105, a runtime module 205 to control the execution of advertisement capable applications 103, the advertising module 109, and the fraud management module 111, an advertisement cache 207, a power module 209, and a location module 211.

The user interface 201 can include various methods of communication. For example, the user interface 201 can have outputs including a visual component (e.g., a screen), an audio component, a physical component (e.g., vibrations), and other methods of communication. User inputs can include a touch-screen interface, a scroll-and-click interface, a button interface, etc. In certain embodiments, the user interface 201 may additionally have a vocal user interface component. As such, a text-to-speech mechanism may be utilized to provide textual information to the user. Further, a speech-to-text mechanism may be utilized to receive vocal input and convert the vocal input into textual input. Moreover, the user interface 201 may be utilized to provide visual output of applications 103 and/or advertisements. As previously noted, the advertising module 109 can control which advertisements are presented with which applications 103. Advertisements can be presented audibly (e.g., as an audio output), as a visual output (e.g., image, video, or other media), etc. and may be interactive.

The communication interface 203 may include multiple means of communication. For example, the communication interface 203 may be able to communicate over SMS, MMS, internet protocol, instant messaging, voice sessions (e.g., via a phone network), or other types of communication protocols. The communication interface 203 can be used by the runtime module 205 to communicate with other UEs 101, the service platform 107, the advertising platform 113, and other devices. In some examples, the communication interface 203 is used to transmit and receive communication messages to obtain services from the service platform 107 and/or advertisement information from the advertising platform 113. In certain embodiments, advertising information includes advertisements, verification check for advertising traffic frauds, demographic information, user profiles, etc. Further, the advertising module 109 may utilize the communication interface 203 to update the advertisement cache 207. As such, the advertising module 109 requests and receives advertisements.

As noted, the UE 101 includes a power module 209. The power module 209 provides power to the UE 101. The power module 209 can include any type of power source (e.g., battery, plug-in, etc.). Additionally, the power module 209 can provide power to the components of the UE 101 including processors, memory, and transmitters. The power module 209 may further provide the runtime module 205 and/or the advertising module 109 with a status of the power supply (e.g., a battery status, such as battery low, a time left for the battery at current power consumption, a percentage of battery power left, etc.).

The location module 211 can determine a user's location. The user's location can be determined by a system such as a GPS, A-GPS, Cell of Origin, or other location extrapolation technologies. Standard GPS and A-GPS systems can use satellites to pinpoint the location of a UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module 211 may also utilize multiple technologies to detect the location of the UE 101. In certain embodiments, the location information can be utilized to determine demographic information and/or user profiles associated with a user of the UE 101.

As discussed, the advertising module 109 implemented at the UE 101 can detect an advertisement triggering event associated with user interface selections, such as the selection of an advertisement in within a screen of an third party application 103. These events may be connection events, pseudo user-interface events, application or system Application Program Interface (API) calls, etc. The event results in a request being sent to the advertising platform 113 that may be the target of click fraud or the like.

In one embodiment, at or about the same time as the detected event, the advertising module 109 can detect certain system states where it would be unlikely or impossible for the user to have clicked. If the event is registered when one of these system states is detected, then the resulting action (e.g., connection to the advertising platform 113) may be disregarded, either by the advertising module 109, the service platform 113, and/or some intermediary network element.

In another embodiment, when an advertisement traffic reporting event is determined as suspicious by the fraud management module 111 in the UE 101 or the fraud management console 115 connected to the advertising platform 113, a number of options may be possible. For example, the fraud management module 111 may handle the event locally, such as by blocking any outgoing actions (e.g., network requests) resulting from the event. Another option that may be taken by the fraud management module 111 is to direct any suspect actions to the advertising platform 113 and/or an intermediary server for further analysis. The analysis server may have more up-to-date resources that can be used to determine evidence of fraudulent events.

Further, the advertising platform 113 and/or the analysis server receive events from a large number of UEs 101, and thus are made aware of the existence of the type, quantity, and signatures of distributed malware or other sources of suspicious events. Upon determining the directed suspect events, the advertising platform 113 and/or the analysis server may block the associated application 103, and/or flag and forward an alert of the application 103.

It will be appreciated that the fraud management module 111 according to embodiments of the invention may be configured to perform combinations of the optional actions when a suspect event is detected. For example, the fraud management module 111 may both flag and send the action to the target advertising platform 113 and send a copy of the event/action the analysis server or the fraud management console 115. In such a scenario, the analysis server or the fraud management console 115 would typically block any further sending of data to the target advertising platform 113. It will also be appreciated that the actions taken by the fraud management module 111 and/or the analysis server may differ depending on previous actions taken. For example, if the fraud management module 111 sends a certain threshold number of flagged suspect actions, it may thereafter choose to block further actions from going to the target advertising platform 113, and/or direct further actions to the analysis server or the fraud management console 115.

Figure 3:
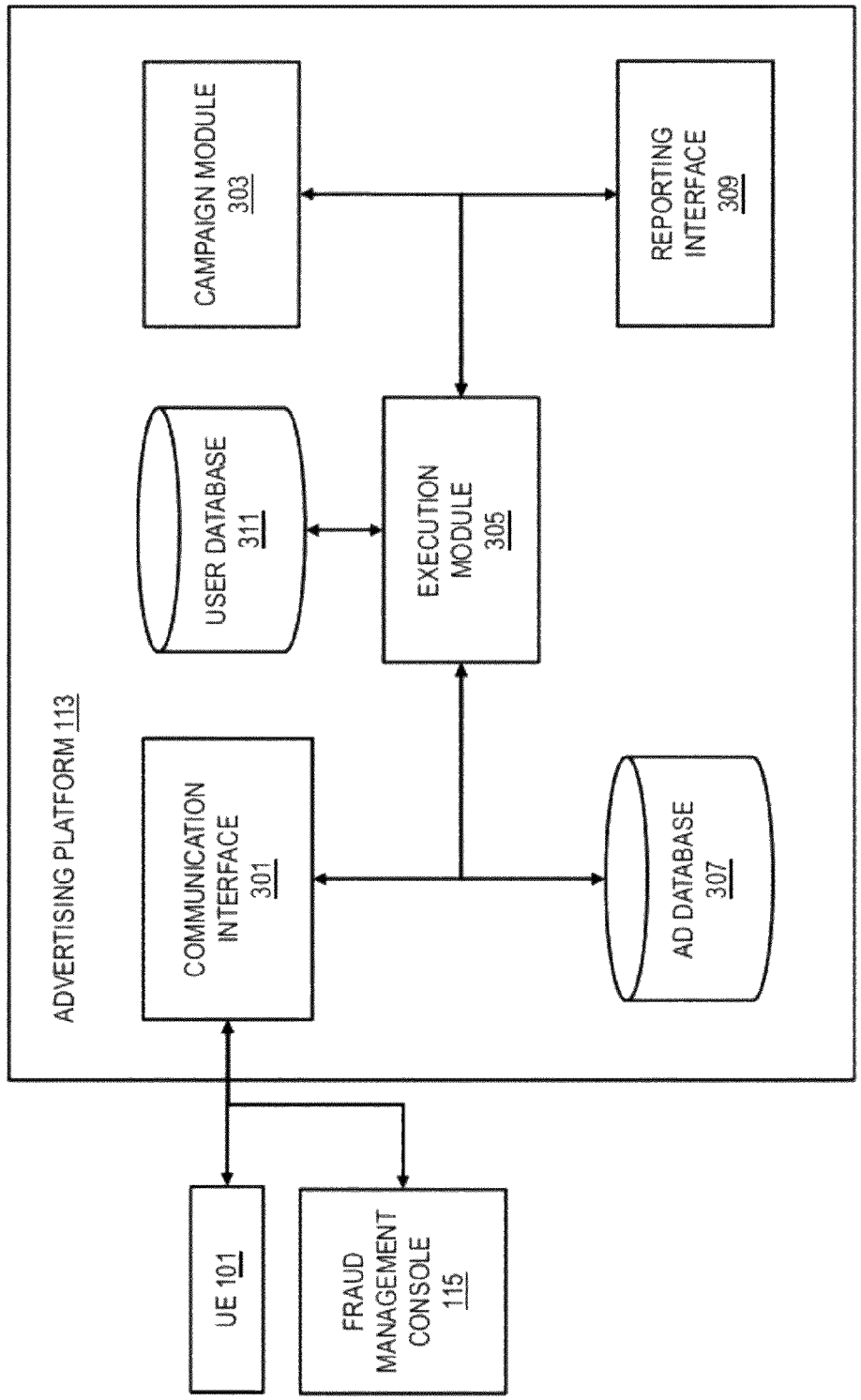
FIG. 3 is a diagram of the components of an advertising platform, according to one embodiment.

FIG. 3 is a diagram of the components of an advertising platform 113, according to one embodiment. By way of example, the advertising platform 113 includes one or more components for providing advertisements and/or advertisement campaigns to UEs 101. It is contemplated that the functions of these components may be combined in one or more components or performed by other components of equivalent functionality. In this embodiment, the advertising platform 113 includes a communication interface 301, a campaign module 303 that can direct and/or serve a verification check for advertising traffic fraud to suitable UEs 101, an execution module 305 that can execute processes and interface between other modules, an advertising database 307, a reporting interface 309, and a user database 311.

The communication interface 301 can be used to communicate with UEs 101, the fraud management console 115, and other devices available over the communication network 105. The execution module 305 can receive information (e.g., a request for advertisements, demographic information, user profiles, etc.) from the UE 101 via the communication interface 301 via methods such as internet protocol, Multimedia Messaging Service (MMS), Short Message Service (SMS), GPRS, or any other available communication method. Components in the communication network 105 and/or communication interface 301 may be utilized to convert one form of communication to another form (e.g., from an SMS to another form of data).

The campaign module 303 can be utilized to receive communications from the advertisers and/or advertisement brokers to obtain advertisement information. As such, one or more advertisements may be provided according to terms of when and/or to whom the advertisements should be presented, as specified by the advertisers and/or advertisement brokers. For example, the advertisements can be associated with parameters to show the advertisements based on certain demographic information. The parameters may additionally utilize user profiles that the user is within a particular demographic to determine whether an associated adverting campaign should be directed and/or served towards the user.

In another embodiment, the campaign module 303 can be utilized to receive communications from the fraud management console 115 and to obtain advertisement information with verification checks. As such, one or more verification checks for advertising traffic frauds associated with an application or developer may be provided in conjunction with advertisements for when and/or to whom the advertisements should be presented. As such, the campaign module 303 can utilize one or more distribution algorithms utilizing the third party application and/or developer information available and/or associated user profiles or groupings of user profiles to determine improve delivery of advertisements associated with the verification check for advertising traffic fraud. The third party application and/or developer information, click-through-rate information about the user, user profiles, verification check results, etc. About users can be stored in the user database 311.

Moreover, the campaign module 303 can receive requests for initiating verification check campaigns for a target application or developer under fraud alerts. The request or subsequent information associated with a verification check campaign can be utilized to populate the advertising database 307. Thus, the advertising database 307 can include one or more advertisements associated with one or more verification check for advertising traffic frauds. The advertising database 307 can additionally include statistical information about one or more of the advertisements and/or verification check for advertising traffic frauds. The statistical information may include normal and fraudulent click-through-rates or other measures of advertisement activity as well as information a target application or developer under fraud alerts. The reporting interface 309 can be utilized to generate and present reports associated with the statistical information gathered in the advertising database 307. These reports can be presented via the fraud management console 115 and/or other UEs 101 or devices communicatively connected to the advertising platform 113.

Figure 4:
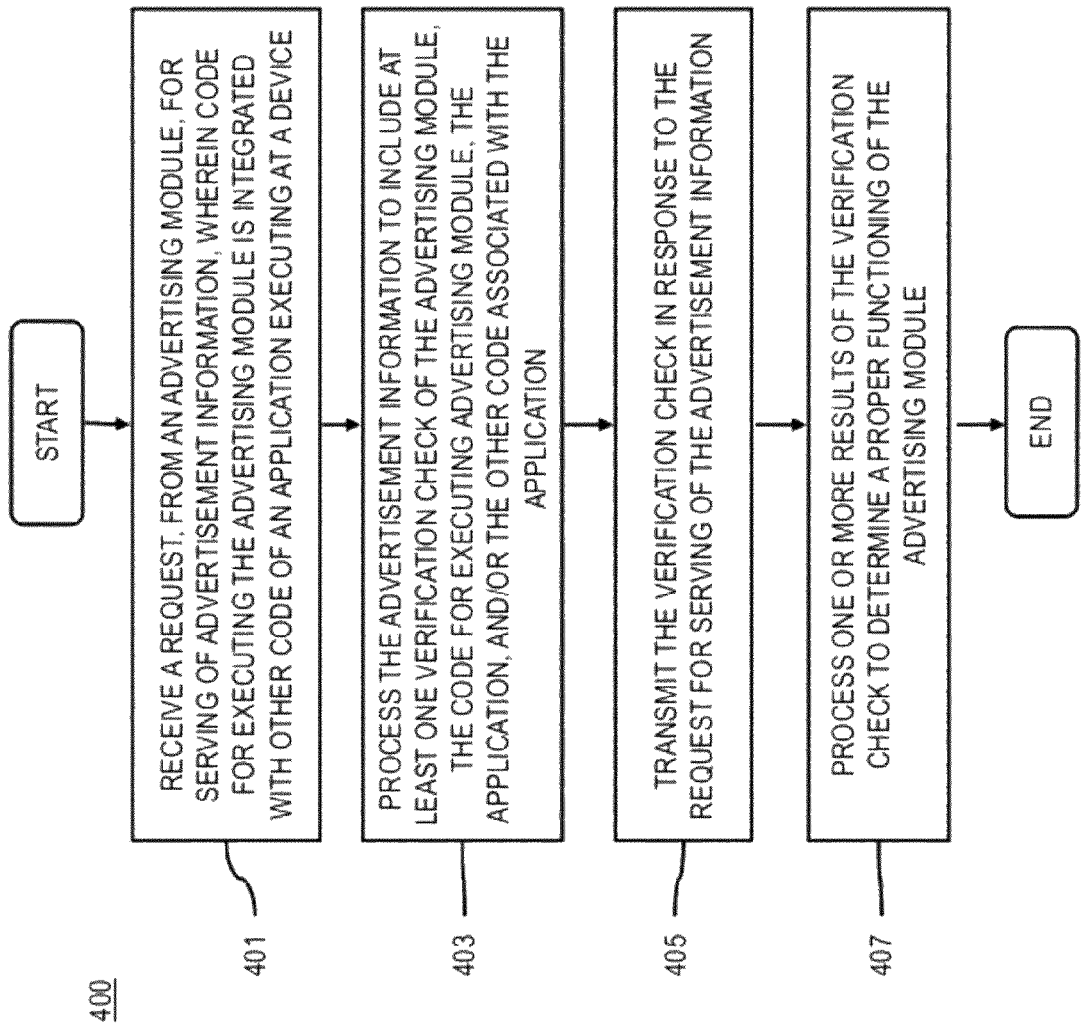
FIG. 4 is a flowchart of a process for detecting fraudulent advertising traffic initiated through an application, according to one embodiment.
Figure 13:
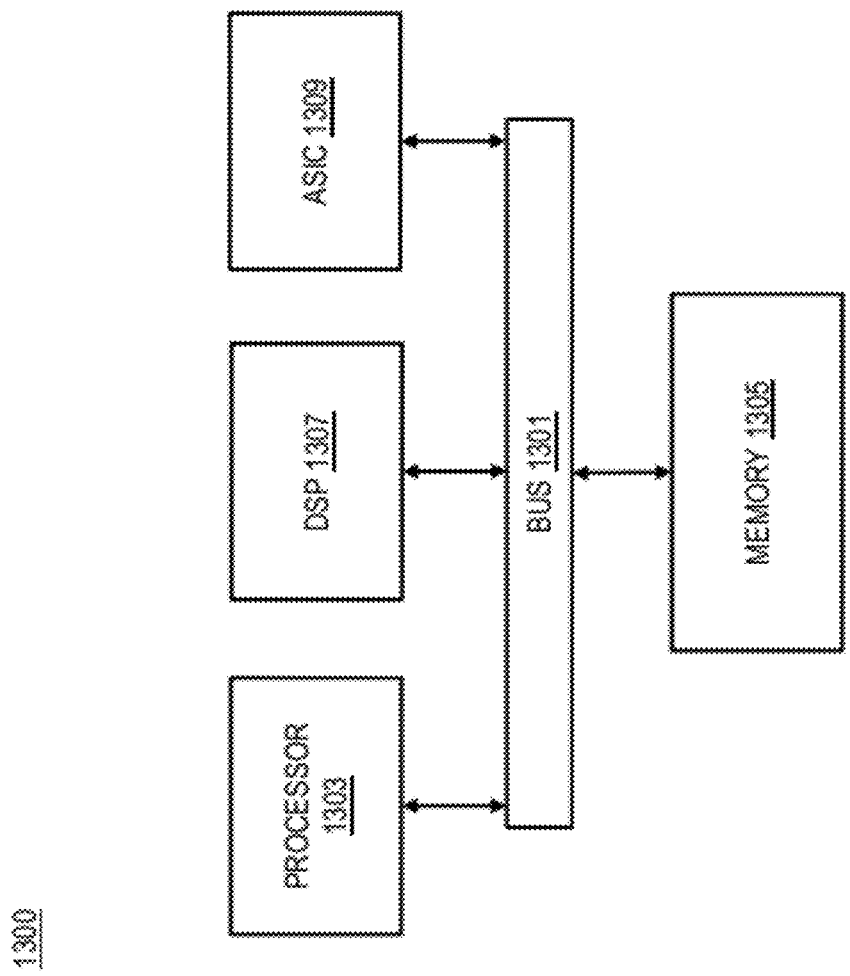
FIG. 13 is a diagram of a chip set that can be used to implement an embodiment of the invention.

FIG. 4 is a flowchart of a process for detecting fraudulent advertising traffic initiated through an application, according to one embodiment. In one embodiment, the advertising platform 113 performs the process 400 and is implemented in, for instance, a chip set including a processor and a memory as shown in FIG. 13.

When a user clicks on an advertisement triggering object within a screen of a third party application, an advertisement request is sent to the local advertising module 109, which then sends the request to an advertising platform 113 described in the object to retrieve relevant advertisement information. The code for executing the advertising module 109 can be integrated with other code of an advertisement capable application 103 executing at the UE 101. The advertisement information may contain data that describes the requesting source of the advertisement (e.g., the third party application ID) and other data that enables the advertising platform to determine what advertisement has been requested (e.g., an advertisement ID), the time of the request (e.g., a timestamp), etc. For example the advertisement information may contain a tag such as: <a href="http://ad.adsvrplat.net/ad?SID=1003">AD INFO</a>

Clicking the triggering object causes a connection (e.g., a TCP/IP connection) to be requested with the advertising platform whose Internet Protocol (IP) address maps to "ad.adsvrplat.net." It will be appreciate that the connections described herein may be initiated from applications such as email client, word processor, etc. And may use protocols e.g., HTTPS, FTP, SIP, etc.

Instead of using tags in the screen of the third party application to redirect an advertisement request to the advertising platform 113, some other selectable object may be used, such as a Java® Applet, Flash® animation, bookmark/URI component, etc. Further, instead of pointing to the target advertising platform 113, the URL may point to an intermediary advertisement server which intercepts the request, logs the source of the request (e.g., the module/application that generated the request and the platform which the request has selected) and then directs the request to the advertising platform 113. The connections to the advertising platform 113 and/or intermediary Web site may involve session tracking object such as "cookies" in order to validate requests and correlate this request with other user behavior.

In step 401, the advertising platform 113 receives the request, from the advertising module 109 of the UE 101, for serving of the advertisement information associated with the words "AD INFO" within the tag. After the advertising platform 113 receives and accepts the HTTP connection, it retrieves from the advertisement database 307 the advertisement corresponding to advertisement ID 1003. In this example, the retrieved advertisement may include the URL contains a parameter "ID=1003" or the name of the advertisement sponsor (e.g., Borders®).

The advertising platform 113 causes, at least in part, processing of the advertisement information to include, in the advertisement associated with Borders®, at least one verification check (Step 403). The verification check may be associated with the advertising module 109, the code for executing advertising module, the advertisement capable application 103, the other code associated with the application, or a combination thereof. The various forms and formats of verification checks are later discussed in conjunction with FIGS. 5-10.

The advertising platform 113 causes, at least in part, transmission of the at least one verification check in response to the request for serving of the advertisement information (Step 405). After receiving the advertisement information, the advertising module 109 presents the advertisement within the screen of the third party application 103. The advertising platform 113 causes, at least in part, processing of one or more results of the at least one verification check to determine a functioning (e.g., detecting fraudulent acts, debug via investigation code) of the advertising module 109 (Step 407).

Figure 5:
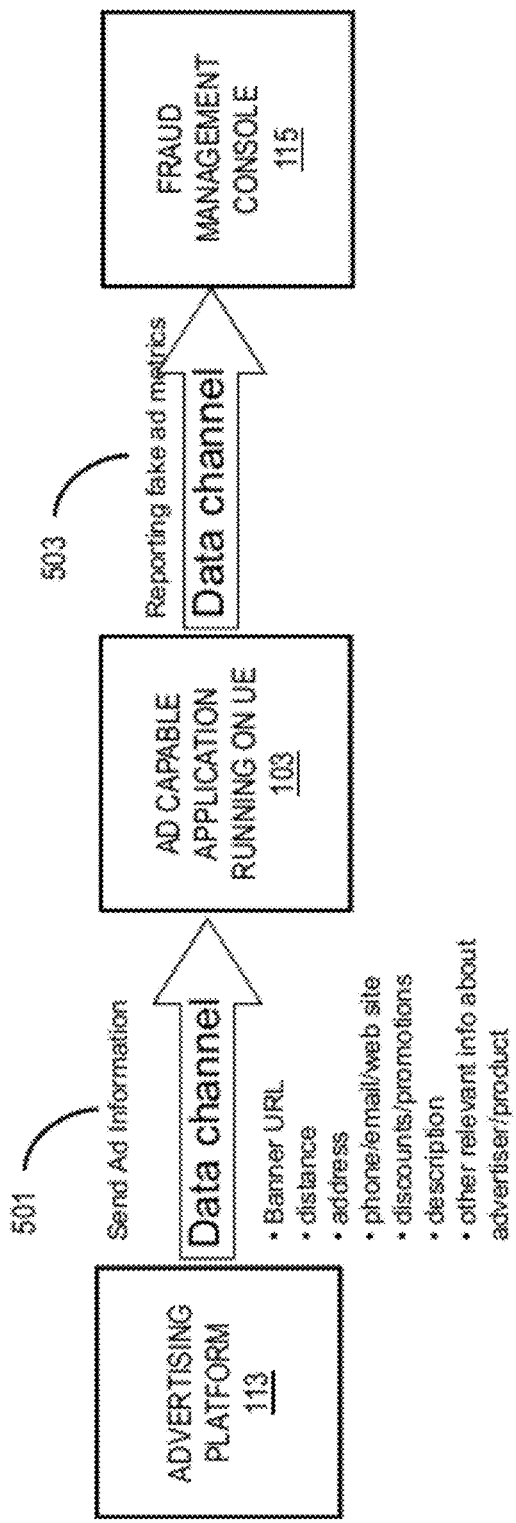
FIG. 5 shows a process for serving advertisement information from the advertising platform to an application running on a user device, according to one embodiment.

FIG. 5 shows a process for serving advertisement information from the advertising platform to an application running on a user device, according to one embodiment. In step 501, the advertising platform 113 sends, via a normal data channel, advertisement information to the advertising module 109 integrated with the application 103 running on the UE 101, in response to a request sent there from. By way of example, the advertisement information includes an advertisement banner URL, a distance (e.g., from the current location of the UE 101, from a point of interest such as home, office, the White House, etc.), an address (e.g., of a store, supermarket, office, etc. That carries the products/services, etc.), a phone/email/web site (e.g., of the store, etc.), discounts/promotions, information of an advertiser/broker, information of the products/services, etc.

After serving the requested advertisement to the user via the application 103 at the UE 101, the advertising module 109 sends via a normal data channel an advertisement serving report to the advertising platform 113 and/or the fraud management console 115 (Step 503). In one embodiment, the fraud management module 111 is a lightweight piece of code that handles and executes different security/verification checks instructed by the advertising platform 113. No state and no statistics or reports are recorded on the UE 101 such that a third party developer can not access these reports via the UE 101. In addition, the piece of code is kept light-weight to hide from the third party developer. Accordingly, the lightweight code and minimum logic can result in improved power consumption efficiency, thus extending operation time and the battery life of the UE 101.

An advertisement serving report can be a summary of all current and past advertisements and/or advertisements campaigns that have been served via the application 103, IP addresses of the users consumed the Ads, etc. The range of the report can be selected by the start and end dates, a time period (e.g., one or more hours, days, weeks, months, years, etc.), a number of reporting instances, a number of fraud instances, a monetary value of the advertisement revenue, etc. The reports may be generated in any selected format, such as HTML, Excel, PDF, etc. In addition, the report may contain ad-initiated user activity (purchase, registration, etc.) that is required by the advertiser and/or broker.

The report includes the performance of a particular advertisement or advertisements in a campaign via an advertisement trigger, or over multiple advertisement triggers. For example, the number of clicks or impressions can be tracked by the advertising module. The estimates information can then be tabulated, reported and/or analyzed. Upon evaluation of the performance data, certain decisions can be made. These decisions can include increasing the number of advertisements at advertisement triggers where the number of clicks/impressions are relatively high, or lowering the number of advertisements at locations where the number of clicks/impressions are relatively low. For particular applications 103, performance characteristic thresholds can be set or dynamically calculated, so that real-time deployment, or re-deployment, of advertisements can be performed.

The common ways in which electronic advertising is charged includes Cost Per Mille (CPM), Cost Per Click (CPC), Cost Per Action (CPA), etc. Cost Per Mille is also called "Cost Per Thousand (CPT)", is where advertisers are charged for exposure/impressions of their message to a specific audience. By way of example, Table 1 shows the advertisements sponsored by different business entities and received different numbers of clicks, impressions and corresponding yields to action/order. Table 1 also shows the placement of an advertisement is in what position within a user interface screen, such as the right corner of Screen 21 ("Rco21"), the top center of Screen 8 ("TC08"), etc., for evaluating the effectiveness of placement locations.

By way of example, the third entry in Table 1 with respect to application ID 113 may be fraudulent, since the click and impression numbers were high yet the yields were relatively low. There may be other reasons for the low yields. For example, the advertisement triggers are appealing (e.g., "the best possible prices you can find online!") while the actual advertisements carrying unattractive sale terms (e.g., high shipping & handling cost, etc.). The various verification checks will be discussed in connection with FIGS. 6-10 to find out whether there is actual fraud.

TABLE 1

| AD ID | Day | Clicks | Yield | impressions | yield | Advertiser/ Broker | App ID | UI placement ID |
|---|---|---|---|---|---|---|---|---|
| 1001 | Dec. 9, 2010 | 235 | 9.90% | 5879 | 12.80% | Grocery Store | 9901 | Rco21 |
| 1002 | Dec. 9, 2010 | 675 | 7.89% | 23625 | 11.29% | Electronics Shop | 1209 | Lco05 |
| 1003 | Dec. 9, 2010 | 17555 | 0.3% | 61442 | 1.5% | Book Store | 113 | TC08 |
| 1004 | Dec. 9, 2010 | 4445 | 13.57% | 133350 | 14.71% | Health Shop | 0022 | BC11 |

FIGS. 6-9 show verification processes for detecting fraudulent advertising traffic initiated through the application of FIG. 5, according to various embodiments. The verification process 1 in FIG. 6 applies to the situations when it is appears that an advertisement capable application is committing advertisement fraud, but there are not enough "hard" proves. Using this verification process, a human investigator inserts custom code into the suspected application and observes the outcome. The outcome will show if the reported advertisement traffic is fraudulent or not (e.g., maybe just a weird technical glitch, etc.).

In the realm of click fraud, a botnet could be used to distribute small communication protocol clients that simulate the advertising module activity in order to generate false click-through rates. Generally, this malware would run in the background of the application 103 and consume few resources in order to avoid detection. The malware can be widely distributed both in time and in a number of infected UEs 101, to generate fraudulent click-through traffic. As perpetrators find new and inventive ways to outmaneuver anti-click fraud measures, it becomes very important to investigate the new fraudulent mechanisms and diagnose actual click-through data, thereby preventing malicious code from operating on the UEs 101.

Figure 6:
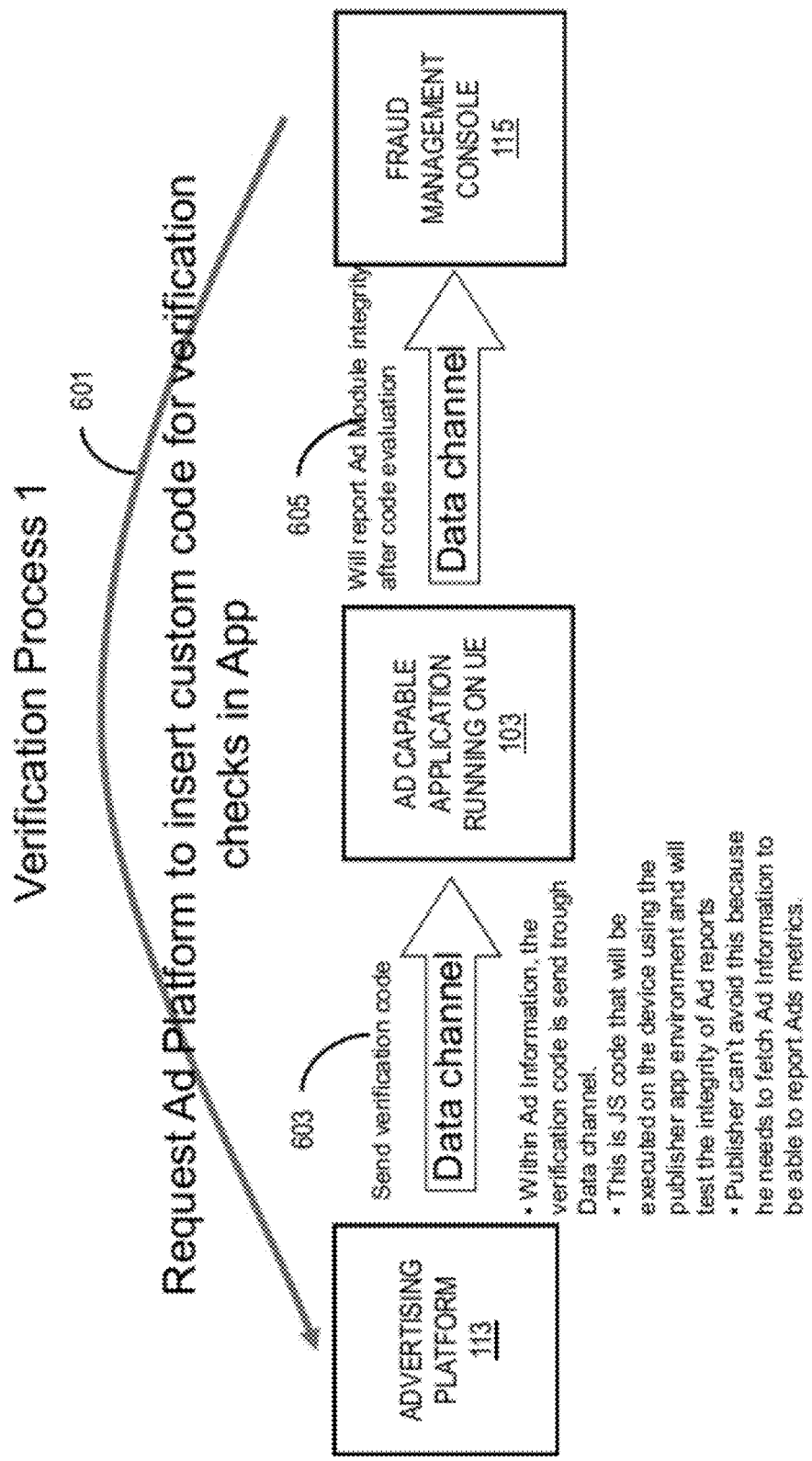
FIGS. 6-9 show verification processes for detecting fraudulent advertising traffic initiated through the application of FIG. 5, according to various embodiments.

According the verification process 1 depicted in FIG. 6, the fraud management console 115 analyzes a report generated via the normal process of FIG. 5, and discovers signs of potential frauds. By way of example, the third entry of Table 1 shows an unusually high click-through rate with a relative low yield of 0.3%. In step 601, the fraud management console 115 requests the advertising platform 113 to insert custom code into the advertisement information for a verification check. In step 603, the advertising platform 113 includes investigation code in the verification check which is sent via a normal data channel to the advertisement capable application 103 running on the UE 101 as discussed with respect to the normal process in FIG. 5. In one embodiment, the verification check is embedded or incorporated in normal advertisement information and sent together with the advertisement information to the application 103. In another embodiment, the verification check is sent via the normal data channel yet sent separately from the normal advertisement information.

When the advertising module 109 fetches advertisement information as usual, the custom code comes through the data channel and will be executed on the suspected application environment, with full access to investigate the fraud. In step 605, the advertisement capable application 103 executes the custom code, and the advertising module 109 generates a new advertising serving report (including investigation data) according to the custom code. The report is then sent to the fraud management console 115 for further analysis. The fraud management console 115 receives investigation data generated by the application 103 based, at least in part, on the investigation code. The investigation code includes one or more diagnostics of at least one serving status of the advertisement information at the UE 101. The investigation code can be custom scripting code (e.g., JavaScript) to be used by the client advertising module 109. The investigation data includes, at least in part, one or more parameters of an execution context of the advertising module 109, the application 103, or a combination thereof. The execution context of the advertising module 109 may include the status of the application 103, operation parameters, what libraries have been called, etc.

By way of example, the investigation code contains all JavaScript code to be executed in different execution contexts. The JavaScript code includes global code (code executed inline, normally as a JavaScript file, or HTML page, loads) gets executed in global execution context, and each invocation of a function has an associated execution context. A new execution context is created whenever control is transferred from the executable code associated with the currently running execution context to executable code that is not associated with that execution context. An execution context contains whatever state is necessary to track the execution progress of its associated code. In addition, each execution context has the state components such as identifier references made by code within the execution context, bindings created by variable statements and function declarations within this execution context, etc. JavaScript execution context may include closures, creating classes, objects, and object members in JavaScript, status of actual parameters, etc. The determination of the functioning of the advertising module 109 is further based, at least in part, on the comparison of the actual parameters against expected values for the parameters.

When a third party developer wants to obtain revenues from fraudulent use of the advertising module, the developer fetches the unique security code given to the developer to identify and verify the report requests and then makes requests manually or with botnets using the security code. Various techniques can be used by the developer to make each request appear to be from a different source, e.g., generation of random cookies, emulation of different types of connections to the advertising platform, use of various alternate routes (if available) to send the advertisement requests, generation of random local machine data (e.g., IP address assigned to the Ethernet interface), etc.

One way the system 100 detects this is to modify the response that contains the security code by making it run a custom function sent from the advertising platform 113 as a parameter in the context of the advertisement capable application 103. This way, the system 100 can compile a series of diagnostics of what is the current state of the advertising module 109, whether the advertisement is actually shown to the user, etc. With a custom function that can be modified at will, the third party developer cannot anticipate the outcome, hence not being able to "fake" the response. Once a diagnostic is compiled, a report is sent to the fraud management console 115 to store and analyze so as to determine the integrity of the advertising module 109 and the fraudulent mechanisms. By way of example, a fraudulent entity can use Trojan code to turn the average person's machines into zombie computers, and uses sporadic redirects or domain name system (DNS) cache poisoning to turn the compromised user's actions into actions for generating revenue for the fraudulent entity.

Figure 7:
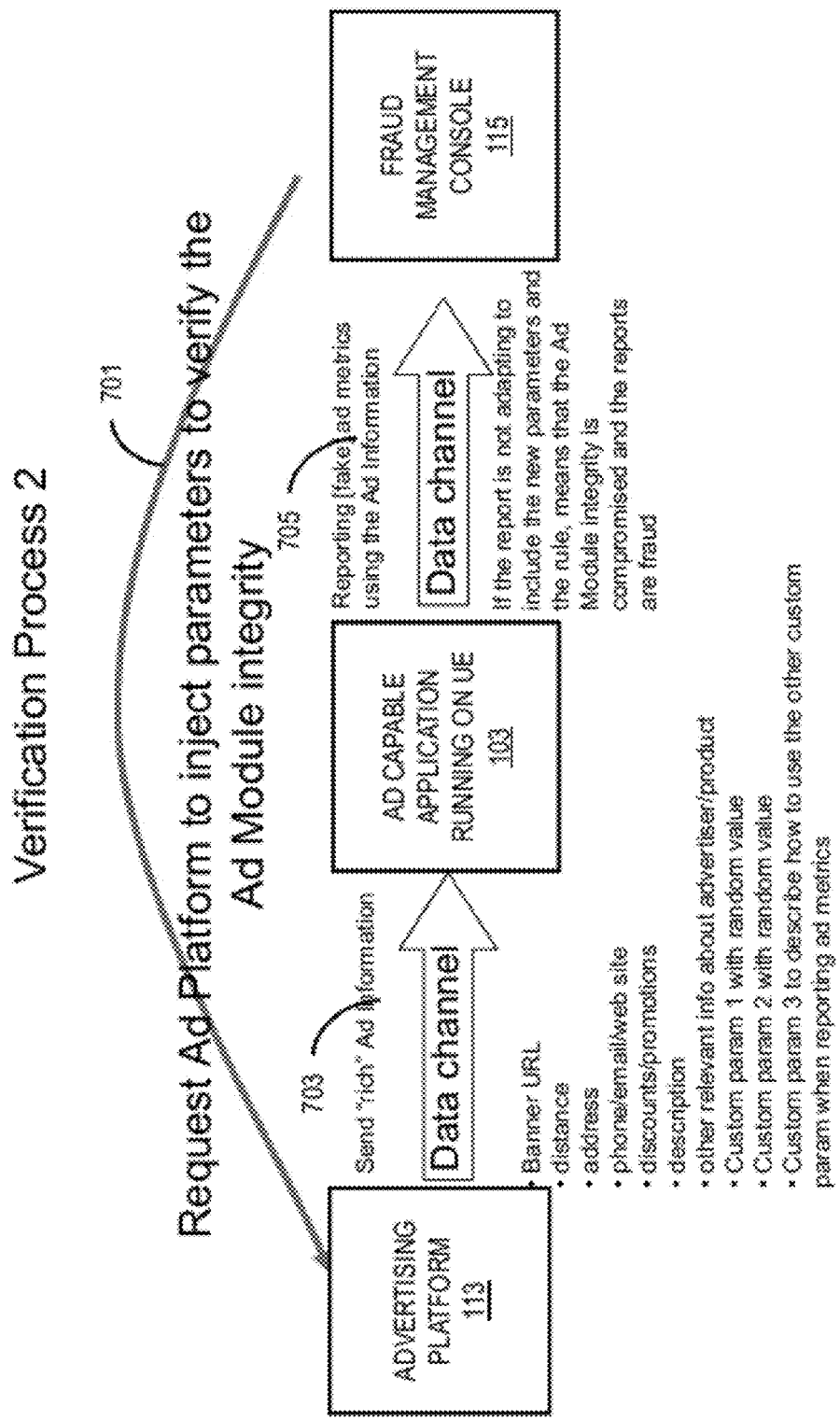

The verification process 2 in FIG. 7 involves a situation that the third party developer alters the advertising module code at will and monitories the outcome. If the fraud management console 115 discovers an unusual high rate of monetization for an affiliated application ID and/or developer ID, it pushes an alternate code for the advertising module 109 for all requests containing that affiliate ID. The alternate code defines a different way for reporting user interactions with advertisements. If the subsequent reports sent from that affiliate ID are still in the pre-alternation way, the advertising traffic is deemed to be programmatic since the application 103 does not reacted to the code alternation.

According a verification process 2 depicted in FIG. 7, the fraud management console 115 determines to deploy one or more altered reporting parameters. In step 701, the fraud management console 115 requests the advertising platform 113 to alter reporting parameters in the advertisement information for a verification check. The one or more altered reporting parameters are included in the at least one verification check and sent to the application 103. By way of example, in addition to the advertisement information sent in the normal process in FIG. 5, some reporting parameters, such as a custom param 1 with random value, a custom param 2 with random value, and/or a custom param 3 to describe how to use the other custom param when reporting advertisement metrics, are included in the advertisement information sent to the application 103 (Step 703).

The fraud management console 115 determines the functioning of the advertising module 109 based, at least in part, on a determination of whether one or more advertisement serving reports generated by the application 103 conform to the one or more altered reporting parameters (Step 705). The one or more altered reporting parameters include one or more different reporting templates (e.g., a different arrangement of columns and rows of a reporting table), one or more different reporting mechanisms (e.g., via emails, SMS, etc.), one or more different hash parameters, or a combination thereof. The one or more altered reporting parameters are generated randomly or substantially randomly.

By way of example, a predefined set of parameters are set to build a hash for sending a report in response to a user interaction to the as platform 113, to validate the legitimacy of that specific user interaction. To detect when the user interaction has been replaced by malicious third-party developers, dynamically change the set of parameters that a hash can be built of (e.g., adding a parameter that can alter the way the hash is to be built). The normal workflow is as follows. A user interacts with the advertisement within the application 103, an action is generated based upon the user interaction, and a hash is built based on a set of parameters, a request is made to the advertising platform 113 with the action and the verification hash by the application 103. The action gets stored, and an acknowledge response is sent to the advertising module 109 from the advertising platform 113. When fraud management console 115 wants to alter the set of parameters, instead of sending an acknowledge to the advertising module 109, the advertising platform 113 sends a new packed function footprint that defines the new set of parameters to be used to build the hash. This footprint will be used at the application 103 to alter the function that builds the verification hash. Any subsequent report should use the new way of building the hash, or the reports are not valid. This technique can be enabled each time manually or be used in conjunction with an expiration period.

In another embodiment, the fraud management console 115 changes the outgoing action, such as by adding a predetermined flag to the data (e.g., add a parameter to a URL, set a value in a cookie) before the advertisement information is sent from the advertising platform 113 to the application 103. This enables the fraud management console 115 to detect additional illicit activity, and investigate further.

When the fraud management console 115 detects a fraudulent advertisement traffic reporting event, the fraud management console 115 may choose to discard/deny the connection to the advertising platform 113. Optionally, the fraud management console 115 broadcasts to other advertisement entities (e.g., advertising platforms and servers) the fraudulent advertisement traffic reporting event and the associated advertisement capable application 103 and the UE 101, so that the advertisement entities can flag the application 103 and the UE 101 as suspect. In some cases (e.g., to further investigate the fraudulent mechanisms and botnets), it may be better to allow the connection to the advertising platform 113 to go through, but flag the application 103 and UE 101 as suspect in some established way. The other advertisement entities may be able to collect additional data related to the application 103 and the UE 101 so as to determine if the suspect advertising traffic is due to some new contingency. In either case, the users may be provided with the option of deciding which course of action to take, such as by selecting or altering a UE configuration setting. By way of example, the users can opt-out on sending private/user data. In another embodiment, the users are not allowed to opt-out data/states that are advertising-module-specific such that the UEs 101 are subject to verifications checks, reports, etc.

Figure 8:
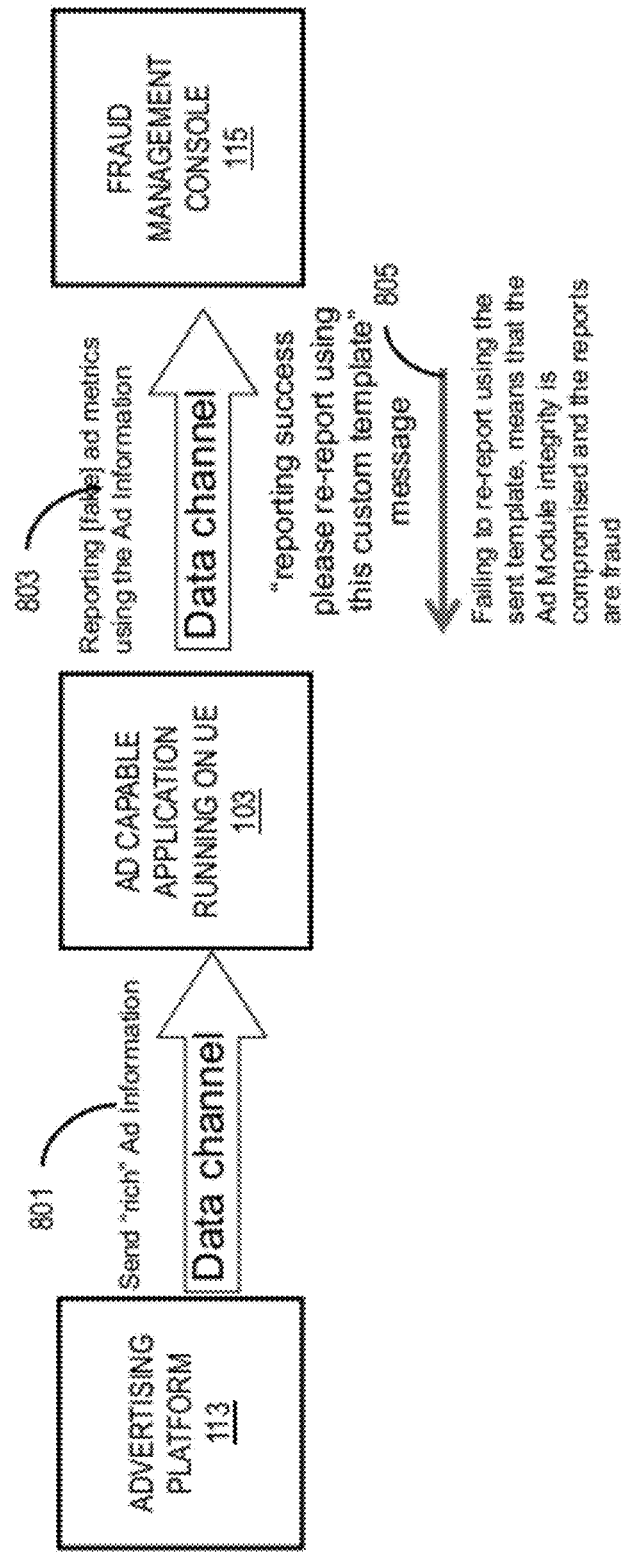

The verification process 3 in FIG. 8 accepts advertisement metrics reports and responds with acknowledge of receiving those reports. On the application side, there is no further step after receiving a "report success" message. The fraud management console 115 can find the fraudulent reports by randomly modifying the "report success" message to include a custom request for re-verification. For example, the advertising platform 113 requests the application 103 to: "report success. Please confirm the report using this custom template [template] and include this additional data [data]" for subsequent reports. Any automated botnets will fail to adapt and deliver the report with newly requested template and/or data.

According the verification process 3 depicted in FIG. 8, in step 801, the advertising platform 113 sends via a normal data channel advertisement information to the advertising module 111 integrated with the application 103 running on the UE 101, in response to a request sent there from. After serving the requested advertisement to the user via the application 103, the advertising module 111 sends via a normal data channel an advertisement serving report to the fraud management console 115 (Step 803). Steps 801-803 occur the same way as Step 501-503 of the normal process of FIG. 5. In step 805, the fraud management console 115 determines to cause, at least in part, transmission of a request re-validate the at least one advertisement serving report. The request to re-validate specifies at least in part a different reporting mechanism (e.g., a different reporting template).

When dealing with advertisements, the system 100 needs to ensure the advertisement traffic reports are genuine. One way to verify such reports is by asking the application 103 to re-validate the report. When an advertisement traffic report is made to the advertising platform 113, at times, the advertising platform 113 may respond with a new report format to validate. The application 103 cannot anticipate and re-validate the reports. This verification process can happen as many times as necessary. In another embodiment, using a new reporting template, the advertising module 109 generates a new validation hash and sends a re-validation report to the advertising platform 113.

Figure 9:
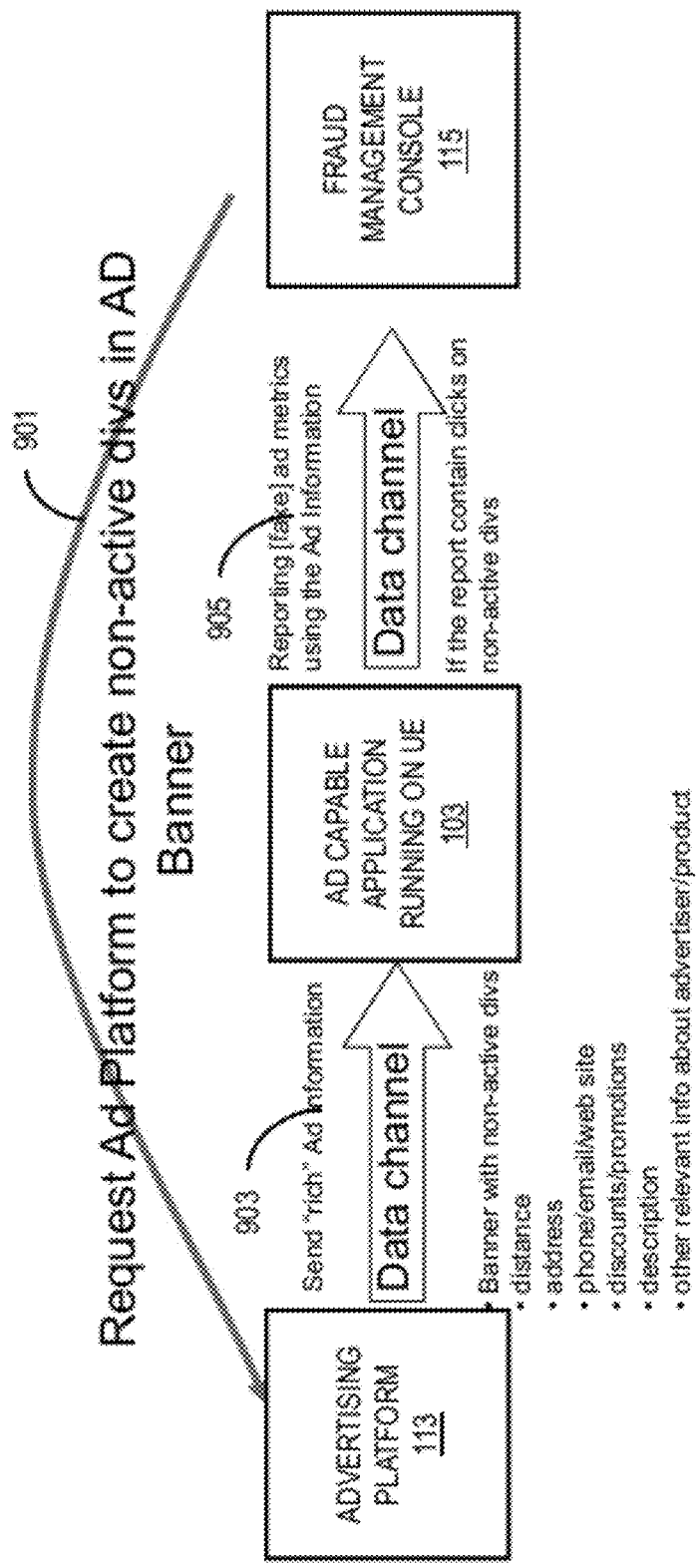

The verification process 4 in FIG. 9 finds the fraudulent affiliates and evidence of the fraud. According a verification process 4 depicted in FIG. 9, the fraud management console 115 determines to generate execution code to cause, at least in part, embedding of one or more non-active portions of the advertisement information, wherein the non-active portions are unknown to the application instructs the advertising platform 113 to include in advertisement information non-active regions or divs unknown to the application 103 (Step 901). The advertising platform 113 determines to generate execution code to cause, at least in part, embedding of one or more non-active portions of the advertisement information, wherein the non-active portions are unknown to the application 103. The advertising platform 113 also determines to generate execution code to cause, at least in part, embedding of one or more non-active portions of the advertisement information, wherein the non-active portions are unknown to the application 103. The advertising platform 113 further determines to include the execution code in the advertisement information. The advertising platform 113 further determines to generate a reporting request to the application 103 to report one or more user interaction areas of the advertisement information. The advertisement information is sent to the application 103 via normal data channel in step 903.

By way of example, a 500 px×80 px advertisement banner is delivered from the advertising platform 113 to the advertisement capable application 103 with a set of divs (e.g., 400 1 px×1 px transparent divs) are set to cover 10% of the banner surface. Then, the advertising platform 113 generates a CSS to randomly position those divs over the banner surface. This is done for each advertisement delivered and is stored on the advertising platform 113. Those small divs will prevent clicks on banners at their position.

In step 905, the fraud management console 115 determines the functioning of the advertising module 109 based, at least in part, on a comparison of the one or more non-active portions against the one or more reported user interaction portions. When a click is reported to the advertising platform 113, the position of the click is compared with the position of the divs in the banner. If the reported click is on any of those non-active positions, the fraud management console 115 can determine that there is evidence of potential fraud. Having a report with 1,000,000 clicks and 80,000 of which are on invalid positions, it is clear that there is evidence of a fraudulent application and/or developer.

Since the advertising platform 113 sends custom code via a normal data channel to the user devices, there is no need to create a custom channel. In this way, the system 100 conserves operational and computational resources. In addition, the advertising platform 113 takes advantage of the third party applications to run the custom code and "investigate" if there is any fraud, rather than using any custom applications to run the custom code, thus further conserving the operational and computational resources.

Figure 10:
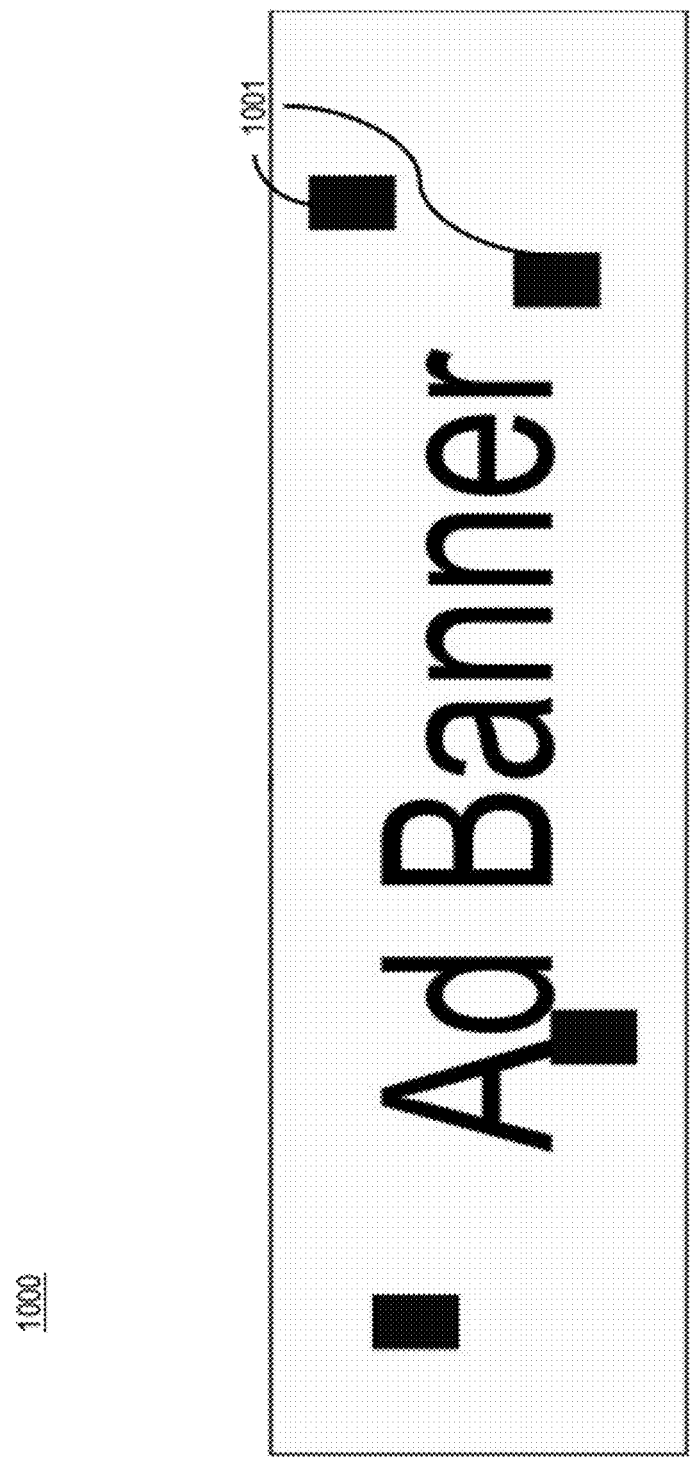
FIG. 10 shows an advertisement banner with non-active areas unknown to the application of FIG. 5, according to one embodiment.

FIG. 10 shows an advertisement banner with divs unknown to the application of FIG. 5, according to one embodiment. By way of example, the rectangular banner 1000 has four square-shaped divs 1001. The banner and the divs can be made of any shapes (e.g., circle, triangle, etc.), and the numbers of divs are arbitrarily set by the fraud management console 115. In one embodiment, the shapes of the divs are defined by dots with a size of 1 px by 1 px and one or more rules for generating the dots randomly. In addition to advertisement banner, other form a or formats of electronic advertisements (e.g., a floating advertisement, expanding advertisement, wallpaper advertisement, pop-up, pop-under, etc.) can also implement the verification process 4.

The security of the system 100 can be achieved by obscurity. These verification checks made available for diagnosis and verifications only to the system 100 and its internal users. The verification checks are maintained with no or minimum exposure externally, especially not to the third party developer.

Figure 11A:
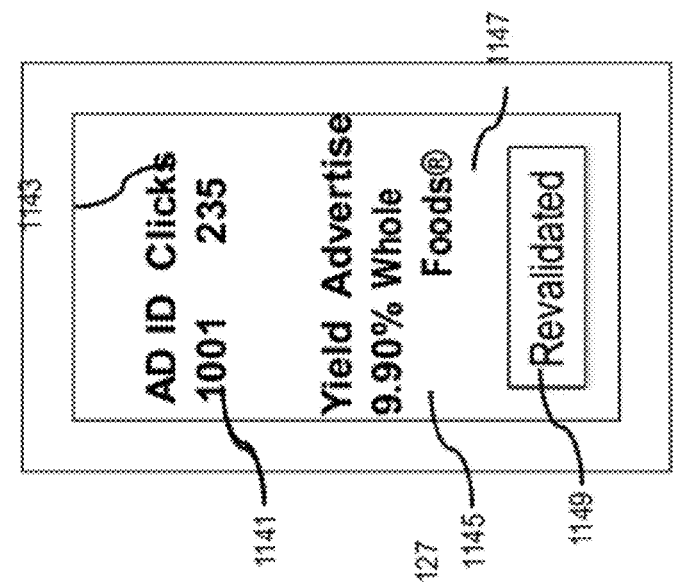
FIGS. 11A-11C are diagrams of user interfaces utilized in the verification process of FIG. 8, according to various embodiments.
Figure 11B:
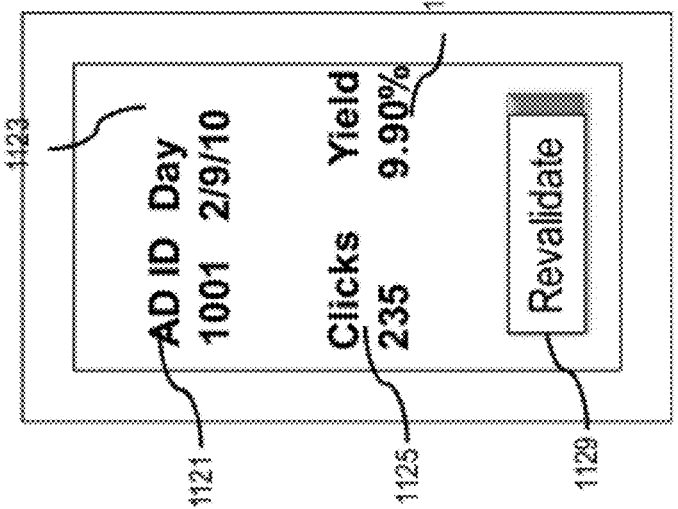
Figure 11C:
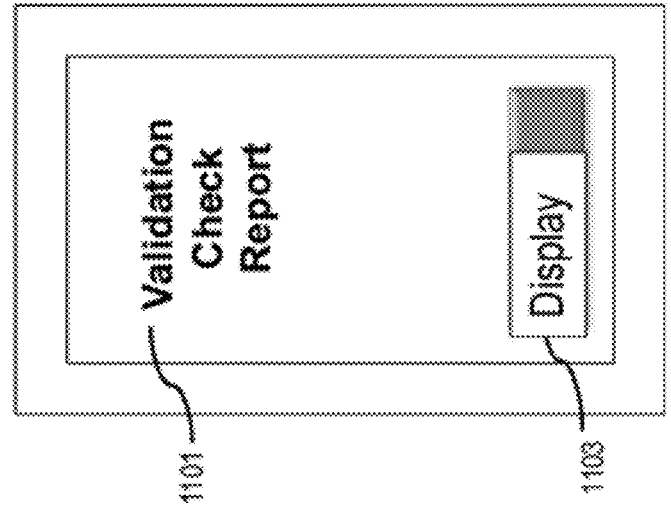

In another embodiment, when the end users of the UEs 101 are interested to know that potentially fraudulent activity occurred on the UE 101, the users may be presented with information about what fraud has occurred. This notification may be through user output hardware (not shown) of the UE 101, or through messaging (e.g., text message, email). An advertisement service provider or system administrator may also be interested in such fraudulent activity and desire alert messages. FIGS. 11A-11C are diagrams of user interfaces utilized in the verification process of FIG. 8, according to various embodiments. FIG. 11A shows a screenshot 1100 includes a prompt "Verification Check Report" 1101 and a "Display" button 1103. After the user selects the "Display" button, an entry of the Verification Check Report is shown in a screenshot 1120 of FIG. 11B that includes: an advertisement ID field 1121, a Day field 1123, a Click field 1125, a Yield field 1127, and a "Revalidate" button 1129. After the user selects the "Revalidate" button, an entry of the Verification Check Report of a different format is shown in a screenshot 1140 of FIG. 11C that includes: an advertisement ID field 1141, a Click field 1143, a Yield field 1145, an Advertiser field 1147, and a "Revalidated" button 1149.

The processes described herein for detecting fraudulent advertising traffic initiated through an application may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 12:
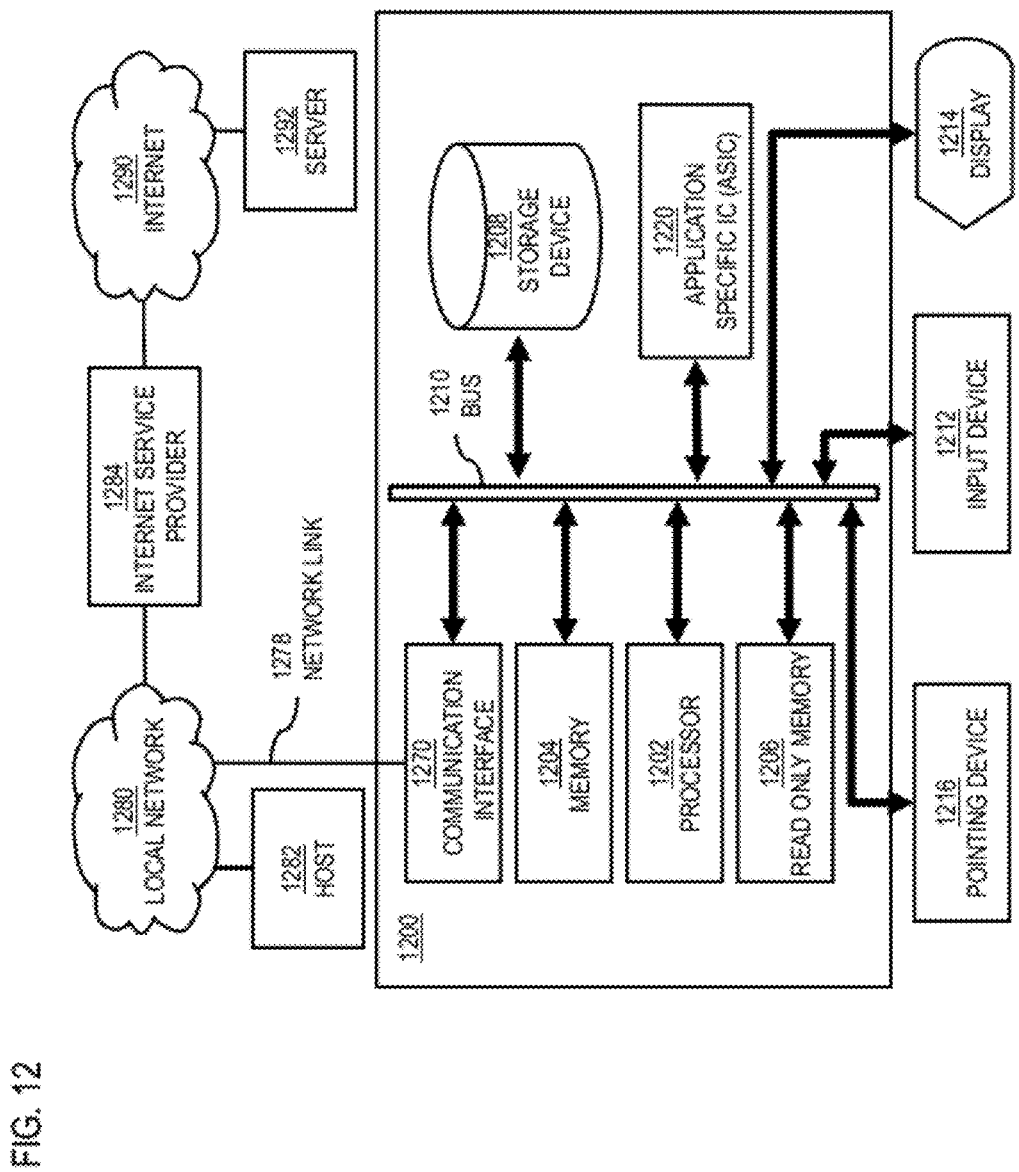
FIG. 12 is a diagram of hardware that can be used to implement an embodiment of the invention.

FIG. 12 illustrates a computer system 1200 upon which an embodiment of the invention may be implemented. Although computer system 1200 is depicted with respect to a particular device or equipment, it is contemplated that other devices or equipment (e.g., network elements, servers, etc.) within FIG. 12 can deploy the illustrated hardware and components of system 1200. Computer system 1200 is programmed (e.g., via computer program code or instructions) to detect fraudulent advertising traffic initiated through an application as described herein and includes a communication mechanism such as a bus 1210 for passing information between other internal and external components of the computer system 1200. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1200, or a portion thereof, constitutes a means for performing one or more steps of detecting fraudulent advertising traffic initiated through an application.

A bus 1210 includes one or more parallel conductors of information so that information is transferred quickly among devices coupled to the bus 1210. One or more processors 1202 for processing information are coupled with the bus 1210.

A processor (or multiple processors) 1202 performs a set of operations on information as specified by computer program code related to detect fraudulent advertising traffic initiated through an application. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1210 and placing information on the bus 1210. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1202, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1200 also includes a memory 1204 coupled to bus 1210. The memory 1204, such as a random access memory (RAM) or any other dynamic storage device, stores information including processor instructions for detecting fraudulent advertising traffic initiated through an application. Dynamic memory allows information stored therein to be changed by the computer system 1200. RAM allows a unit of information stored at a location called a memory address to be stored and retrieved independently of information at neighboring addresses. The memory 1204 is also used by the processor 1202 to store temporary values during execution of processor instructions. The computer system 1200 also includes a read only memory (ROM) 1206 or any other static storage device coupled to the bus 1210 for storing static information, including instructions, that is not changed by the computer system 1200. Some memory is composed of volatile storage that loses the information stored thereon when power is lost. Also coupled to bus 1210 is a non-volatile (persistent) storage device 1208, such as a magnetic disk, optical disk or flash card, for storing information, including instructions, that persists even when the computer system 1200 is turned off or otherwise loses power.

Information, including instructions for detecting fraudulent advertising traffic initiated through an application, is provided to the bus 1210 for use by the processor from an external input device 1212, such as a keyboard containing alphanumeric keys operated by a human user, or a sensor. A sensor detects conditions in its vicinity and transforms those detections into physical expression compatible with the measurable phenomenon used to represent information in computer system 1200. Other external devices coupled to bus 1210, used primarily for interacting with humans, include a display device 1214, such as a cathode ray tube (CRT), a liquid crystal display (LCD), a light emitting diode (LED) display, an organic LED (OLED) display, a plasma screen, or a printer for presenting text or images, and a pointing device 1216, such as a mouse, a trackball, cursor direction keys, or a motion sensor, for controlling a position of a small cursor image presented on the display 1214 and issuing commands associated with graphical elements presented on the display 1214. In some embodiments, for example, in embodiments in which the computer system 1200 performs all functions automatically without human input, one or more of external input device 1212, display device 1214 and pointing device 1216 is omitted.

In the illustrated embodiment, special purpose hardware, such as an application specific integrated circuit (ASIC) 1220, is coupled to bus 1210. The special purpose hardware is configured to perform operations not performed by processor 1202 quickly enough for special purposes. Examples of ASICs include graphics accelerator cards for generating images for display 1214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1200 also includes one or more instances of a communications interface 1270 coupled to bus 1210. Communication interface 1270 provides a one-way or two-way communication coupling to a variety of external devices that operate with their own processors, such as printers, scanners and external disks. In general the coupling is with a network link 1278 that is connected to a local network 1280 to which a variety of external devices with their own processors are connected. For example, communication interface 1270 may be a parallel port or a serial port or a universal serial bus (USB) port on a personal computer. In some embodiments, communications interface 1270 is an integrated services digital network (ISDN) card or a digital subscriber line (DSL) card or a telephone modem that provides an information communication connection to a corresponding type of telephone line. In some embodiments, a communication interface 1270 is a cable modem that converts signals on bus 1210 into signals for a communication connection over a coaxial cable or into optical signals for a communication connection over a fiber optic cable. As another example, communications interface 1270 may be a local area network (LAN) card to provide a data communication connection to a compatible LAN, such as Ethernet. Wireless links may also be implemented. For wireless links, the communications interface 1270 sends or receives or both sends and receives electrical, acoustic or electromagnetic signals, including infrared and optical signals, that carry information streams, such as digital data. For example, in wireless handheld devices, such as mobile telephones like cell phones, the communications interface 1270 includes a radio band electromagnetic transmitter and receiver called a radio transceiver. In certain embodiments, the communications interface 1270 enables connection to the advertising platform 113 for detecting fraudulent advertising traffic initiated through an application at the UE 101.

The term "computer-readable medium" as used herein refers to any medium that participates in providing information to processor 1202, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1208. Volatile media include, for example, dynamic memory 1204. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1220.

Network link 1278 typically provides information communication using transmission media through one or more networks to other devices that use or process the information. For example, network link 1278 may provide a connection through local network 1280 to a host computer 1282 or to equipment 1284 operated by an Internet Service Provider (ISP). ISP equipment 1284 in turn provides data communication services through the public, world-wide packet-switching communication network of networks now commonly referred to as the Internet 1290.

A computer called a server host 1292 connected to the Internet hosts a process that provides a service in response to information received over the Internet. For example, server host 1292 hosts a process that provides information representing video data for presentation at display 1214. It is contemplated that the components of system 1200 can be deployed in various configurations within other computer systems, e.g., host 1282 and server 1292.

At least some embodiments of the invention are related to the use of computer system 1200 for implementing some or all of the techniques described herein. According to one embodiment of the invention, those techniques are performed by computer system 1200 in response to processor 1202 executing one or more sequences of one or more processor instructions contained in memory 1204. Such instructions, also called computer instructions, software and program code, may be read into memory 1204 from another computer-readable medium such as storage device 1208 or network link 1278. Execution of the sequences of instructions contained in memory 1204 causes processor 1202 to perform one or more of the method steps described herein. In alternative embodiments, hardware, such as ASIC 1220, may be used in place of or in combination with software to implement the invention. Thus, embodiments of the invention are not limited to any specific combination of hardware and software, unless otherwise explicitly stated herein.

The signals transmitted over network link 1278 and other networks through communications interface 1270, carry information to and from computer system 1200. Computer system 1200 can send and receive information, including program code, through the networks 1280, 1290 among others, through network link 1278 and communications interface 1270. In an example using the Internet 1290, a server host 1292 transmits program code for a particular application, requested by a message sent from computer 1200, through Internet 1290, ISP equipment 1284, local network 1280 and communications interface 1270. The received code may be executed by processor 1202 as it is received, or may be stored in memory 1204 or in storage device 1208 or any other non-volatile storage for later execution, or both. In this manner, computer system 1200 may obtain application program code in the form of signals on a carrier wave.

Various forms of computer readable media may be involved in carrying one or more sequence of instructions or data or both to processor 1202 for execution. For example, instructions and data may initially be carried on a magnetic disk of a remote computer such as host 1282. The remote computer loads the instructions and data into its dynamic memory and sends the instructions and data over a telephone line using a modem. A modem local to the computer system 1200 receives the instructions and data on a telephone line and uses an infra-red transmitter to convert the instructions and data to a signal on an infra-red carrier wave serving as the network link 1278. An infrared detector serving as communications interface 1270 receives the instructions and data carried in the infrared signal and places information representing the instructions and data onto bus 1210. Bus 1210 carries the information to memory 1204 from which processor 1202 retrieves and executes the instructions using some of the data sent with the instructions. The instructions and data received in memory 1204 may optionally be stored on storage device 1208, either before or after execution by the processor 1202.

FIG. 13 illustrates a chip set or chip 1300 upon which an embodiment of the invention may be implemented. Chip set 1300 is programmed to detect fraudulent advertising traffic initiated through an application as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1300 can be implemented in a single chip. It is further contemplated that in certain embodiments the chip set or chip 1300 can be implemented as a single "system on a chip." It is further contemplated that in certain embodiments a separate ASIC would not be used, for example, and that all relevant functions as disclosed herein would be performed by a processor or processors. Chip set or chip 1300, or a portion thereof, constitutes a means for performing one or more steps of providing user interface navigation information associated with the availability of functions. Chip set or chip 1300, or a portion thereof, constitutes a means for performing one or more steps of detecting fraudulent advertising traffic initiated through an application.

In one embodiment, the chip set or chip 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1300 includes merely one or more processors and some software and/or firmware supporting and/or relating to and/or for the one or more processors.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform the inventive steps described herein to detect fraudulent advertising traffic initiated through an application. The memory 1305 also stores the data associated with or generated by the execution of the inventive steps.

Figure 14:
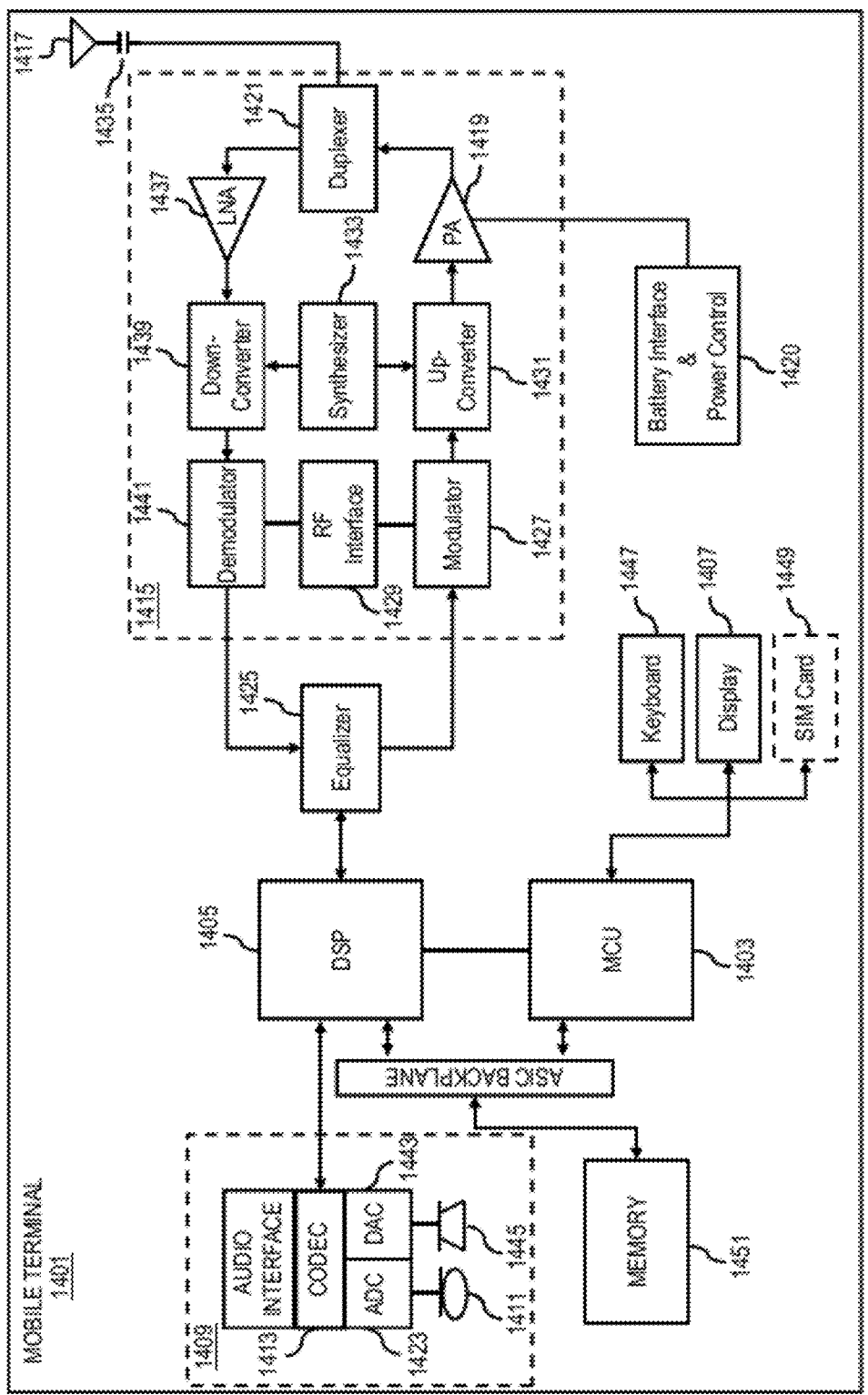
FIG. 14 is a diagram of a mobile terminal (e.g., handset) that can be used to implement an embodiment of the invention.

FIG. 14 is a diagram of exemplary components of a mobile terminal (e.g., handset) for communications, which is capable of operating in the system of FIG. 1, according to one embodiment. In some embodiments, mobile terminal 1401, or a portion thereof, constitutes a means for performing one or more steps of detecting fraudulent advertising traffic initiated through an application. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1403, a Digital Signal Processor (DSP) 1405, and a receiver/transmitter unit including a microphone gain control unit and a speaker gain control unit. A main display unit 1407 provides a display to the user in support of various applications and mobile terminal functions that perform or support the steps of detecting fraudulent advertising traffic initiated through an application. The display 1407 includes display circuitry configured to display at least a portion of a user interface of the mobile terminal (e.g., mobile telephone). Additionally, the display 1407 and display circuitry are configured to facilitate user control of at least some functions of the mobile terminal. An audio function circuitry 1409 includes a microphone 1411 and microphone amplifier that amplifies the speech signal output from the microphone 1411. The amplified speech signal output from the microphone 1411 is fed to a coder/decoder (CODEC) 1413.

A radio section 1415 amplifies power and converts frequency in order to communicate with a base station, which is included in a mobile communication system, via antenna 1417. The power amplifier (PA) 1419 and the transmitter/modulation circuitry are operationally responsive to the MCU 1403, with an output from the PA 1419 coupled to the duplexer 1421 or circulator or antenna switch, as known in the art. The PA 1419 also couples to a battery interface and power control unit 1420.

In use, a user of mobile terminal 1401 speaks into the microphone 1411 and his or her voice along with any detected background noise is converted into an analog voltage. The analog voltage is then converted into a digital signal through the Analog to Digital Converter (ADC) 1423. The control unit 1403 routes the digital signal into the DSP 1405 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1425 for compensation of any frequency-dependent impairments that occur during transmission though the air such as phase and amplitude distortion. After equalizing the bit stream, the modulator 1427 combines the signal with a RF signal generated in the RF interface 1429. The modulator 1427 generates a sine wave by way of frequency or phase modulation. In order to prepare the signal for transmission, an up-converter 1431 combines the sine wave output from the modulator 1427 with another sine wave generated by a synthesizer 1433 to achieve the desired frequency of transmission. The signal is then sent through a PA 1419 to increase the signal to an appropriate power level. In practical systems, the PA 1419 acts as a variable gain amplifier whose gain is controlled by the DSP 1405 from information received from a network base station. The signal is then filtered within the duplexer 1421 and optionally sent to an antenna coupler 1435 to match impedances to provide maximum power transfer. Finally, the signal is transmitted via antenna 1417 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1401 are received via antenna 1417 and immediately amplified by a low noise amplifier (LNA) 1437. A down-converter 1439 lowers the carrier frequency while the demodulator 1441 strips away the RF leaving only a digital bit stream. The signal then goes through the equalizer 1425 and is processed by the DSP 1405. A Digital to Analog Converter (DAC) 1443 converts the signal and the resulting output is transmitted to the user through the speaker 1445, all under control of a Main Control Unit (MCU) 1403 which can be implemented as a Central Processing Unit (CPU) (not shown).

The MCU 1403 receives various signals including input signals from the keyboard 1447. The keyboard 1447 and/or the MCU 1403 in combination with other user input components (e.g., the microphone 1411) comprise a user interface circuitry for managing user input. The MCU 1403 runs a user interface software to facilitate user control of at least some functions of the mobile terminal 1401 to detect fraudulent advertising traffic initiated through an application. The MCU 1403 also delivers a display command and a switch command to the display 1407 and to the speech output switching controller, respectively. Further, the MCU 1403 exchanges information with the DSP 1405 and can access an optionally incorporated SIM card 1449 and a memory 1451. In addition, the MCU 1403 executes various control functions required of the terminal. The DSP 1405 may, depending upon the implementation, perform any of a variety of conventional digital processing functions on the voice signals. Additionally, DSP 1405 determines the background noise level of the local environment from the signals detected by microphone 1411 and sets the gain of microphone 1411 to a level selected to compensate for the natural tendency of the user of the mobile terminal 1401.

The CODEC 1413 includes the ADC 1423 and DAC 1443. The memory 1451 stores various data including call incoming tone data and is capable of storing other data including music data received via, e.g., the global Internet. The software module could reside in RAM memory, flash memory, registers, or any other form of writable storage medium known in the art. The memory device 1451 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1449 carries, for instance, important information, such as the cellular phone number, the carrier supplying service, subscription details, and security information. The SIM card 1449 serves primarily to identify the mobile terminal 1401 on a radio network. The card 1449 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    receiving, by an apparatus, a first request for modifying a functioning of an advertising module residing at a device;
    receiving, by the apparatus, a second request, via a network from the advertising module, for serving of advertisement information, wherein code for executing the advertising module is integrated with other code of an application executing at the device;
    processing, by the apparatus, the advertisement information in response to the first request, to include in the advertisement information, at least one verification check of the advertising module, at least one verification check of the code for executing advertising module, at least one verification check of the application, at least one verification check of the other code associated with the application, or a combination thereof;
    transmitting, by the apparatus, the at least one verification check included in the advertisement information to the device via a data channel unknown to the application in response to the second request; and
    processing, by the apparatus, one or more results of the at least one verification check to determine the functioning of the advertising module,
    wherein the advertising module is verified if the determined functioning of the advertising module includes, at least in part, the requested modification.

2. The method of claim 1, wherein the at least one verification check includes, at least in part, investigation code, and the method further comprising:
    determining the functioning of the advertising module based, at least in part, on the investigation code; and
    receiving investigation data generated by the application based, at least in part, on the investigation code,
    wherein the processing of the one or more results includes, at least in part, processing of the investigation data, and
    wherein the investigation code comes through the data channel and is executed on the application.

3. The method of claim 2, wherein the investigation data includes, at least in part, one or more parameters of an execution context of the advertising module, the application, or a combination thereof, and the method further comprising:
    comparing the one or more parameters against one or more expected values for the one or more parameters,
    wherein the determining the functioning of the advertising module is further based, at least in part, on the comparison.

4. The method of claim 2, wherein the investigation code includes one or more diagnostics of at least one serving status of the advertisement information at the device.

5. The method of claim 1, the method further comprising:
    generating one or more altered reporting parameters,
    wherein the one or more altered reporting parameters are included in the at least one verification check, and
    wherein the determining the functioning of the advertising module is further based, at least in part, on determining whether one or more advertisement serving reports generated by the application conform to the one or more altered reporting parameters.

6. The method of claim 5, wherein the one or more altered reporting parameters include one or more different reporting templates, one or more different reporting mechanisms, one or more different hash parameters, or a combination thereof.

7. The method of claim 5, wherein the one or more altered reporting parameters are generated randomly or substantially randomly.

8. An apparatus comprising:
    at least one processor; and
    at least one memory including computer program code for one or more programs,
    the at least one memory and the computer program code configured to, with the at least one processor, cause the apparatus to perform at least the following,
        receive a first request for modifying a functioning of an advertising module residing at a device;
        receive a second request, via a network from the advertising module, for serving of advertisement information, wherein code for executing the advertising module is integrated with other code of an application executing at the device;
        process the advertisement information in response to the first request, to include in the advertisement information, at least one verification check of the advertising module, at least one verification check of the code for executing advertising module, at least one verification check of the application, at least one verification check of the other code associated with the application, or a combination thereof;
        transmit the at least one verification check included in the advertisement information to the device via a data channel unknown to the application in response to the second request; and process one or more results of the at least one verification check to determine the functioning of the advertising module, wherein the advertising module is verified if the determined functioning of the advertising module includes, at least in part, the requested modification.

9. The apparatus of claim 8, wherein the at least one verification check includes, at least in part, investigation code, and wherein the apparatus is further caused to:

determine the functioning of the advertising module based, at least in part, on the investigation code; and receive investigation data generated by the application based, at least m part, on the investigation code, wherein the processing of the one or more results includes, at least in part, processing of the investigation data, and wherein the investigation code comes through the data channel and is executed on the application.

10. The apparatus of claim 9, wherein the investigation data includes, at least in part, one or more parameters of an execution context of the advertising module, the application, or a combination thereof, and wherein the apparatus is further caused to:

compare the one or more parameters against one or more expected values for the one or more parameters, wherein the determination of the functioning of the advertising module is further based, at least in part, on the comparison.

11. The apparatus of claim 9, wherein the investigation code includes one or more diagnostics of at least one serving status of the advertisement information at the apparatus.

12. The apparatus of claim 8, wherein the apparatus is further caused to:

determine to generate one or more altered reporting parameters, wherein the one or more altered reporting parameters are included in the at least one verification check, and wherein the determination of the functioning of the advertising module is further based, at least in part, on a determination of whether one or more advertisement serving reports generated by the application conform to the one or more altered reporting parameters.

13. The apparatus of claim 12, wherein the one or more altered reporting parameters include one or more different reporting templates, one or more different reporting mechanisms, one or more different hash parameters, or a combination thereof.

14. The apparatus of claim 12, wherein the one or more altered reporting parameters are generated randomly or substantially randomly.

* * * * *